United States Patent
Molloy et al.

(10) Patent No.: US 12,471,784 B2
(45) Date of Patent: Nov. 18, 2025

(54) SYSTEMS AND METHODS FOR MEASURING TEMPERATURES OF INDIVIDUALS

(71) Applicant: Trimedika Limited, Belfast (GB)

(72) Inventors: Roisin Molloy, Belfast (GB); Gerry Cairns, Belfast (GB)

(73) Assignee: Trimedika Limited, Belfast (GB)

( * ) Notice: Subject to any disclaimer, the term of this patent is extended or adjusted under 35 U.S.C. 154(b) by 503 days.

(21) Appl. No.: 17/842,184

(22) Filed: Jun. 16, 2022

(65) Prior Publication Data

US 2022/0400957 A1 Dec. 22, 2022

Related U.S. Application Data

(60) Provisional application No. 63/212,551, filed on Jun. 18, 2021.

(51) Int. Cl.
*A61B 5/01* (2006.01)
*A61B 5/00* (2006.01)
*G01J 5/02* (2022.01)
*G01K 13/20* (2021.01)

(52) U.S. Cl.
CPC .............. *A61B 5/01* (2013.01); *G01J 5/025* (2013.01); *G01K 13/20* (2021.01); *A61B 5/742* (2013.01)

(58) Field of Classification Search
CPC .. A61B 5/01; A61B 5/742; G01J 5/025; G01J 5/02; G01K 13/20
See application file for complete search history.

(56) References Cited

U.S. PATENT DOCUMENTS

| | | | | |
|---|---|---|---|---|
| 4,509,531 A | * | 4/1985 | Ward | G01K 1/143 374/E1.019 |
| 10,638,936 B2 | * | 5/2020 | Lane | A61B 5/7278 |
| 11,020,031 B1 | * | 6/2021 | Simpson | A61B 5/14539 |
| 2011/0257521 A1 | | 10/2011 | Fraden | |
| 2014/0064333 A1 | * | 3/2014 | Roth | G01K 1/028 374/170 |

(Continued)

FOREIGN PATENT DOCUMENTS

| | | | | |
|---|---|---|---|---|
| CN | 111601545 A | * | 8/2020 | A61B 5/002 |
| EP | 2797000 | | 10/2014 | |

(Continued)

OTHER PUBLICATIONS

International Search Report and Written Opinion for International PCT Patent Application No. PCT/IB2022/055588, mailed Jan. 5, 2023 (21 pages).

*Primary Examiner* — Alexander A Mercado
*Assistant Examiner* — Julia Fitzpatrick
(74) *Attorney, Agent, or Firm* — Fox Rothschild LLP; Carol E. Thorstad-Forsyth

(57) ABSTRACT

Systems and methods for operating a thermometer. The methods comprise: generating first sensor data by at least one first sensor of the thermometer; analyzing, by a processor of the thermometer, the first sensor data to obtain a distance value specifying a distance between the thermometer and a surface of a body of a target individual at which the thermometer is pointed; modifying, by the processor, a sensitivity of a thermometer circuit based on the distance value; and generating, by the thermometer circuit, a body temperature measurement for the target individual.

25 Claims, 27 Drawing Sheets

(56) References Cited

U.S. PATENT DOCUMENTS

| | | | |
|---|---|---|---|
| 2014/0121989 A1* | 5/2014 | Kamath | G16Z 99/00 |
| | | | 702/19 |
| 2017/0095157 A1* | 4/2017 | Tzvieli | A61B 5/6803 |
| 2017/0156594 A1* | 6/2017 | Stivoric | A61B 5/0008 |
| 2017/0367627 A1* | 12/2017 | Brister | A61B 5/1468 |
| 2019/0154509 A1* | 5/2019 | Koch | A61B 5/015 |
| 2019/0175096 A1* | 6/2019 | Xi | A61B 5/441 |
| 2021/0003453 A1* | 1/2021 | Ruther | G01J 5/025 |
| 2021/0072173 A1* | 3/2021 | Spengler | G01N 33/497 |
| 2021/0169417 A1* | 6/2021 | Burton | A61B 5/4857 |

FOREIGN PATENT DOCUMENTS

| | | | | |
|---|---|---|---|---|
| WO | WO-2020066337 A1 * | 4/2020 | | G02F 1/133305 |
| WO | WO-2020206372 A1 * | 10/2020 | | A61B 5/0008 |

* cited by examiner

SYSTEMS AND METHODS FOR MEASURING TEMPERATURES OF INDIVIDUALS

CROSS-REFERENCE TO RELATED APPLICATIONS

The present application claims priority to U.S. Provisional Patent Application Ser. No. 63/212,551 which was filed on Jun. 18, 2021. The entire content of this Provisional Application is incorporated herein by reference.

BACKGROUND

Statement of the Technical Field

The present disclosure relates generally to thermometers. More particularly, the present disclosure relates to implementing systems and methods for measuring temperatures of individuals.

Description of the Related Art

Thermometers have been used to measure temperatures of individuals. Each thermometer comprises a temperature sensor which measures a change in temperature, converts the measure temperature change into a numerical value representing a temperature of an individual, and causes the numerical value to be stored in a datastore.

SUMMARY

The present document concerns implementing systems and methods for operating a thermometer. The methods comprising: generating first sensor data by at least one first sensor of the thermometer; analyzing, by a processor of the thermometer, the first sensor data to obtain a distance value specifying a distance between the thermometer and a surface of a body of a target individual at which the thermometer is pointed; modifying, by the processor, a sensitivity of a thermometer circuit based on the distance value; generating, by the thermometer circuit, a body temperature measurement for the target individual; and/or modifying the body temperature measurement when second sensor data indicates that the thermometer is not equilibrated. The sensitivity of the thermometer circuit can be modified by, for example, changing a position of a vent to adjust an overall size of an aperture of a thermometer circuit, changing calibration parameters for the thermometer, changing an algorithm used to compute or otherwise adjust a temperature measurement value, and/or changing a temperature measurement technique being used by the thermometer.

In some scenarios, the methods also comprise: performing operations to cause alignment of the thermometer circuit with a target spot on the target individual without assistance from a user of the thermometer; causing the thermometer to measure an ambient temperature of a surrounding environment; causing an ambient temperature measurement to be communicated from the thermometer to an external device (e.g., a heating, ventilation and air conditioning system); causing the thermometer to transition to a hypothermic or hyperthermic mode of operation in which accurate body temperature measurements are able to be generated in a temperature range of 30° C. to 34° C. or 40° C. to 42° C.; and/or preventing a spread of infection using a surface of thermometer at least partially formed of an anti-microbial material.

In those or other scenarios, the methods comprise: detecting changes in an airflow inside the thermometer or outside of the thermometer; detecting a presence of an enabled fan in proximity to the thermometer based on the changes in the airflow which were detected; and/or dynamically adjusting operation of the thermometer to account for the enabled fan's expected effects to temperature measurements. This adjustment can include, but is not limited to, causing a value (for example, 0.01° C. to 2° C. to be added to or subtracted from a temperature measurement).

In those or other scenarios, the methods comprise: detecting excess moisture on a surface of the target individual; and/or causing a notification of the excess moisture to be output from the thermometer.

In those or other scenarios, the methods comprise selecting one of a plurality of temperature measurement techniques that is to be used by the thermometer circuit to generate the body temperature measurement for the target individual. The temperature measurement techniques can include, but are not limited to, a shutter-based technique, a multi-temperature sensor-based technique and an interchangeable filter-based technique. The body temperature measurement may be generated by the thermometer circuit using signals output from a plurality of interchangeable bandpass filters when the interchangeable filter-based technique is selected.

The thermometer circuit may be caused to transition between first and second ones of the temperature measurement techniques based on second sensor data, the distance value, a condition of an environment internal to the thermometer, a condition of an environment external to the thermometer, a body part of the target individual that is closest to the thermometer, and/or a medical condition of the target individual. The thermometer circuit may alternatively be caused to transition between first and second ones of the temperature measurement techniques in response to a trigger event. The trigger event can include, but is not limited to, a user-software interaction (for example, depression of key on a keyboard for entering a command), actuation of an input device (for example, depression of a button), movement of the thermometer into a specific geographic location, a temperature measurement exceeding a threshold value (for example, a value equal to or less than 35° C. (or 95° F.) or equal to or greater than 38° C. (or 100.4° F.)), or a change in sensitivity of the temperature sensor.

In those or other scenarios, the methods comprise: detecting a skin condition (for example, eczema, sun burn, blister, rash and/or insect bite) for the target individual based on second sensor data; and using the detected skin condition to check an acceptability of the body temperature measurement. For example, a body temperature measurement can be considered acceptable when its value falls within an expected range (for example, a value greater than or greater than 37° C. (or 98.6° F.) or 38° C. (or 100.4° F.)) for an individual with a given skin condition and/or medical condition indicated by the skin condition (such as a fever, chickenpox and/or systemic infection). The present solution is not limited to the particulars of this example.

In those or other scenarios, the methods comprise: periodically and automatically generating reference temperature measurements for the target individual and detecting when a value of the reference temperature measurements falls outside of a specified range (for example, 35° C. (or 95° F.) to 38° C. (or 100.4° F.); causing an indicator to be output from the thermometer which indicates a detection has been made that the value of the reference temperature measurements falls outside of the specified range; and/or causing a recommendation for attending to a medical condition (for example, hyperthermia or fever) of the target individual to be output from the thermometer when a detection is made that the value of the reference temperature measurements falls outside of the specified range.

In those or other scenarios, the methods comprise: selecting the threshold value from a plurality of threshold values (for example, values outside of the range of 32° C. (or 89.6° F.) and 38° C. (or 100.4° F.)) based on an average temperature of the target individual over a given period of time, a difference between measured temperature values in a given set, a trend in the measured temperature value, and/or a weighted combination of the measured temperature values. An output may be provided from the thermometer based on results from comparing the body temperature measurement generated for the target individual to the threshold value which was selected. For example, a threshold value of 38° C. (or 100.4° F.) is selected when the average temperature of the target individual is 37° C. (or 98.6° F.). The present solution is not limited to the particulars of this example.

Additionally or alternatively, the methods comprise: obtaining, by a computing device, sensor data generated by a plurality of sensors disposed at different locations in the thermometer; analyzing, by the computing device, the sensor data to detect an anomaly or pattern therein; and modifying, by the computing device, operations of the thermometer based on the anomaly or pattern. The sensors can include, but are not limited to, humidity sensor(s), temperature sensor(s), accelerometer(s), mechanical shock/vibration sensor(s), scent/smell sensor(s), location sensor(s), camera (s), and microphone(s). The different locations can include, but are not limited to, a location adjacent to an internal processor or computing device of the thermometer, a location on a printed circuit board of the thermometer, a location embedded in a housing of the thermometer, and/or a location on the housing. The sensor data can include, but is not limited to, a temperature of an electronic component of the thermometer, a temperature of a printed circuit board of the thermometer, a temperature at a reference location inside the thermometer, a temperature of an environment external to the thermometer, a humidity inside the thermometer housing, a humidity of an external environment, any shock and/or vibration experienced by the thermometer, any acceleration and/or other movement experienced by the thermometer, sounds internal to the thermometer, sounds external to the thermometer, any scents/smells inside of and/or outside of the thermometer, locations of the thermometer, and/or objects in proximity to the thermometer.

The anomaly or pattern may be detected using a machine learning algorithm. The detected anomaly or pattern may indicate whether the thermometer is equilibrated. The modifying may comprise transitioning operational modes of the thermometer and/or adjusting temperature measurement value(s) in accordance with offset value(s) selected or determined based on the detected anomaly or pattern.

The machine learning algorithm may additionally or alternatively be used to predict measurement inaccuracies, system faults or malfunctions based on the detected anomaly or pattern. The machine learning algorithm may be trained to detect combinations of at least two of a temperature measurement value, a humidity measurement value, a device vibration, an applied external force, a sound of a given type, a smell, a proximity of an object of a given type, a device deformation, a device movement, and a device location.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors, adders, multipliers, etc.), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

The present solution will be described with reference to the following drawing figures, in which like numerals represent like items throughout the figures.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present solution concerns an improved thermometer. The thermometer implements novel functions and internal controls that result in improved temperature measurements and other device operations. The novel functions and internal controls will become evident as the discussion progresses.

Illustrative Systems

Figure 1:
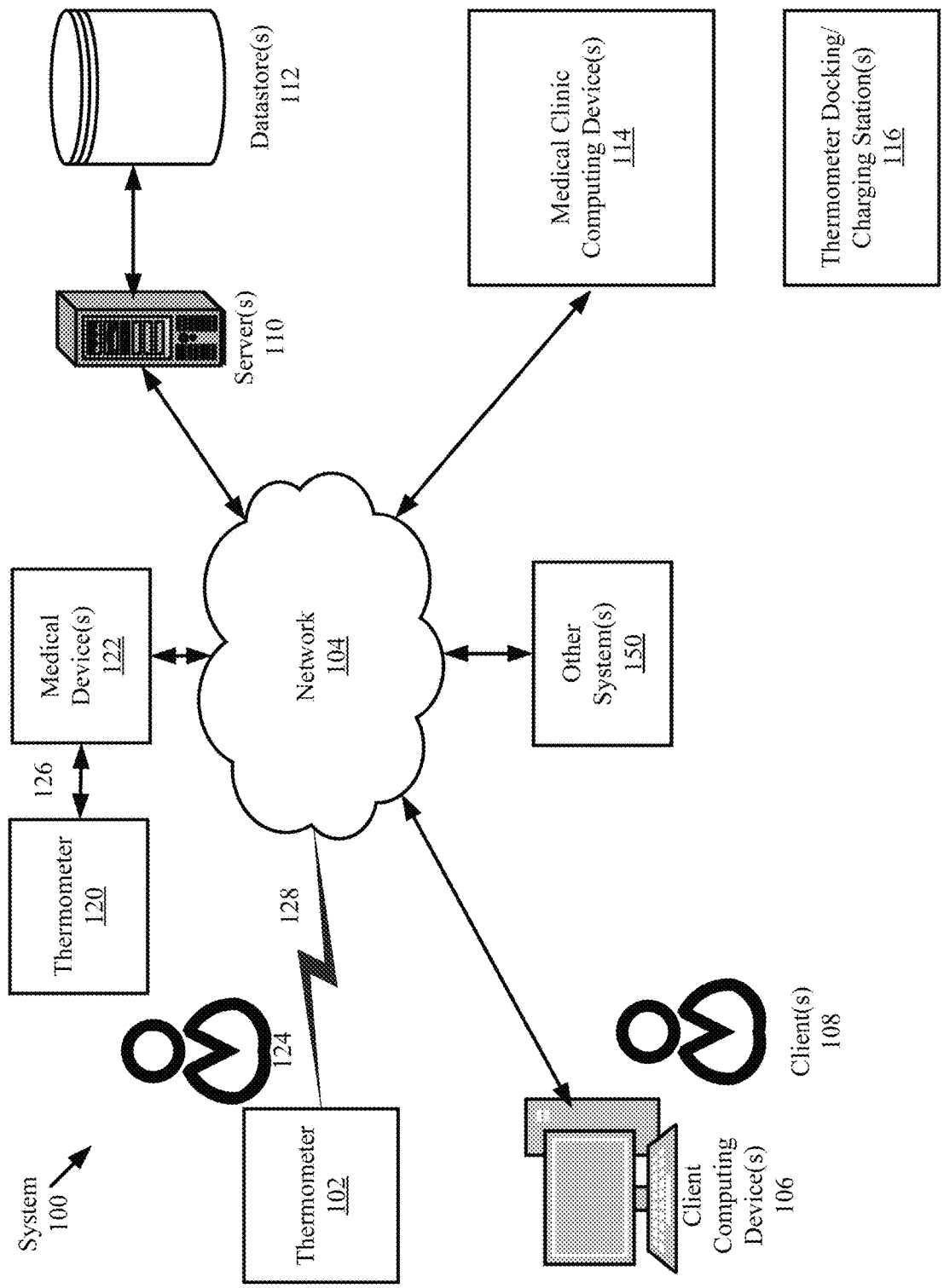
FIG. 1 provides an illustration of an illustrative system.

Referring now to FIG. 1, there is provided an illustration of a system 100 implementing the present solution. System 100 comprises thermometers 102, 120, a network 104, client computing device(s) 106, server(s) 110, datastore(s) 112, medical client computing device(s) 114, thermometer docking/charging station(s) 116, and medical device(s) 122. The client computing device(s) 106 and/or medical clinic computing device(s) 114 can include, but is(are) not limited to, personal computers, desktop computers (as shown), tablets, smart phones, personal digital assistants, smart watches, and other devices. In some scenarios, the computing device(s) 106, 114 and/or medical device(s) 122 run(s) software application(s) for using/operating the thermometer(s) 102, 120. Additionally or alternatively, the computing device(s) 106, 114 and/or medical device(s) 122 access(es) cloud service(s) to facilitate use and/or control of operations of the thermometer(s). The medical device(s) 122 can include, but is(are) not limited to, patient bed(s), medicine dispenser(s), ventilator(s), and/or vital sign monitor(s).

Each thermometer 102, 120 is generally configured to measure temperatures of individual(s) 124 (e.g., a patient of a medical clinic, a family member such as a child, etc.). The manner in which such measurements are made will become evident as the discussion progresses. The temperature measurements can be communicated to remote device(s) 106, 110, 114, 122 via a wired communication link 126, a wireless communications link 128, and/or the network 104.

The network 104 can include, but is not limited to, the Internet, an Intranet, a cellular network, a WiFi network, a Bluetooth network, a Bluetooth Low Energy (BLE) network, a Zigbee network, a Long Range Wireless Netrwork (LoRaWAN) network, a Narrow Band Internet of Things (NB-IoT) network, a telecommunications network (3G, 4G, 5G), a Long Term Evolution (LTE) network, an Radio Frequency (RF) network, a Near Field Communication (NFC) network, a Short Range Communication (SRC) network, a Long Range Communications (LRC) network, and/or any other known or to be known network. The network can be implemented via network nodes such as access nodes and/or gateways. A network security system (e.g., firewall(s)) can be provided to monitor and control incoming and/or outgoing network traffic based on defined security rules.

The thermometer docking/charging station(s) 116 can: selectively be paired or otherwise communicatively coupled to the thermometer(s) 102, 120 to, for example, allow Over The Air (OTA) access to data and/or operational control of the thermometer(s) 102, 120; charge the thermometer(s) 102, 120 via inductive coupling or other means; transfer data, codes and/or software to/from the thermometer(s) 102, 120; act as a communications hub for the system 100; and/or incorporate any wireless communication technology.

Figure 2:
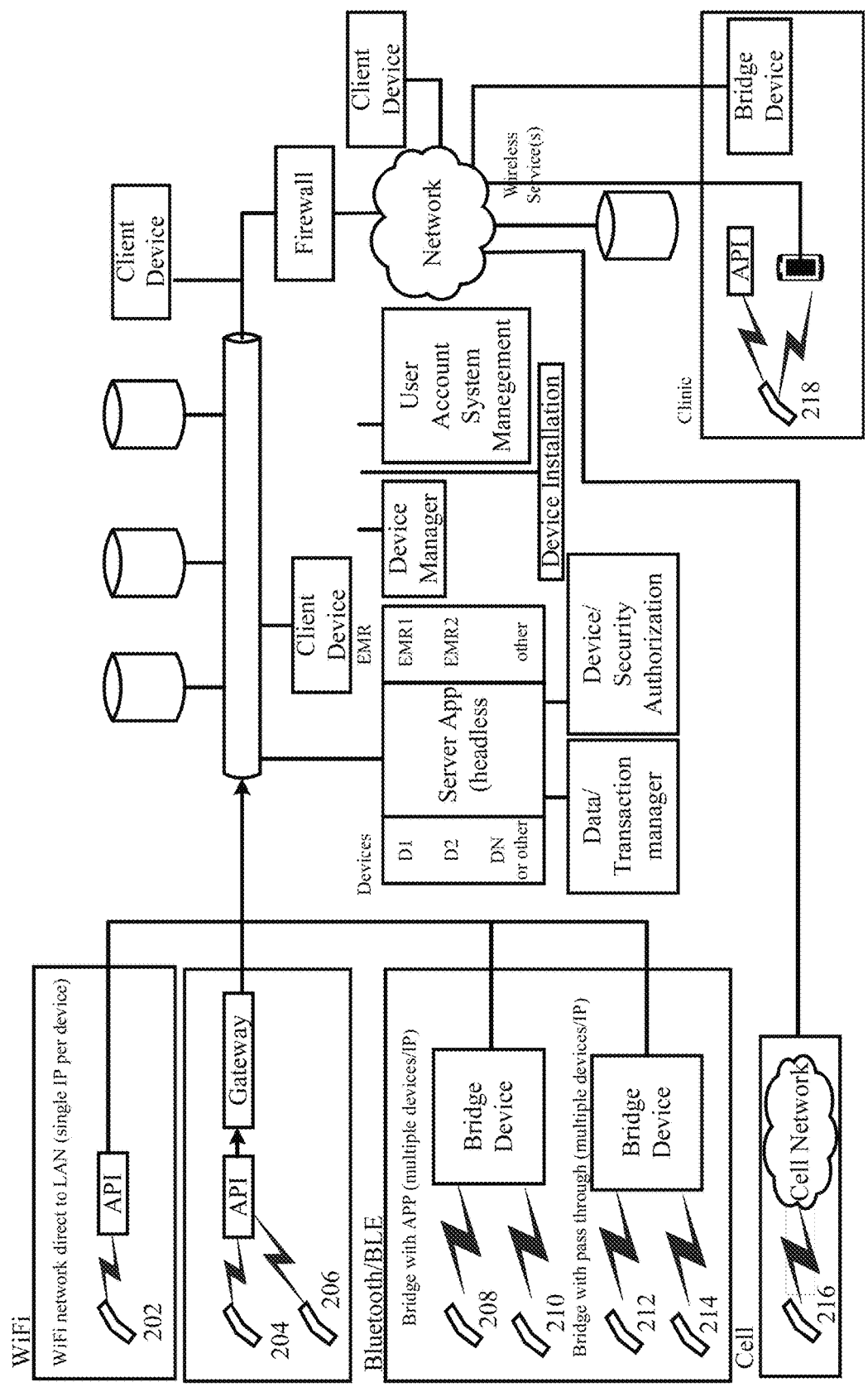
FIG. 2 provides an illustration of another illustrative system.

The present solution is not limited to the system architecture shown in FIG. 1. Other system architectures can be used to implement the present solution. Another illustrative system architecture is shown in FIG. 2.

Figure 3:
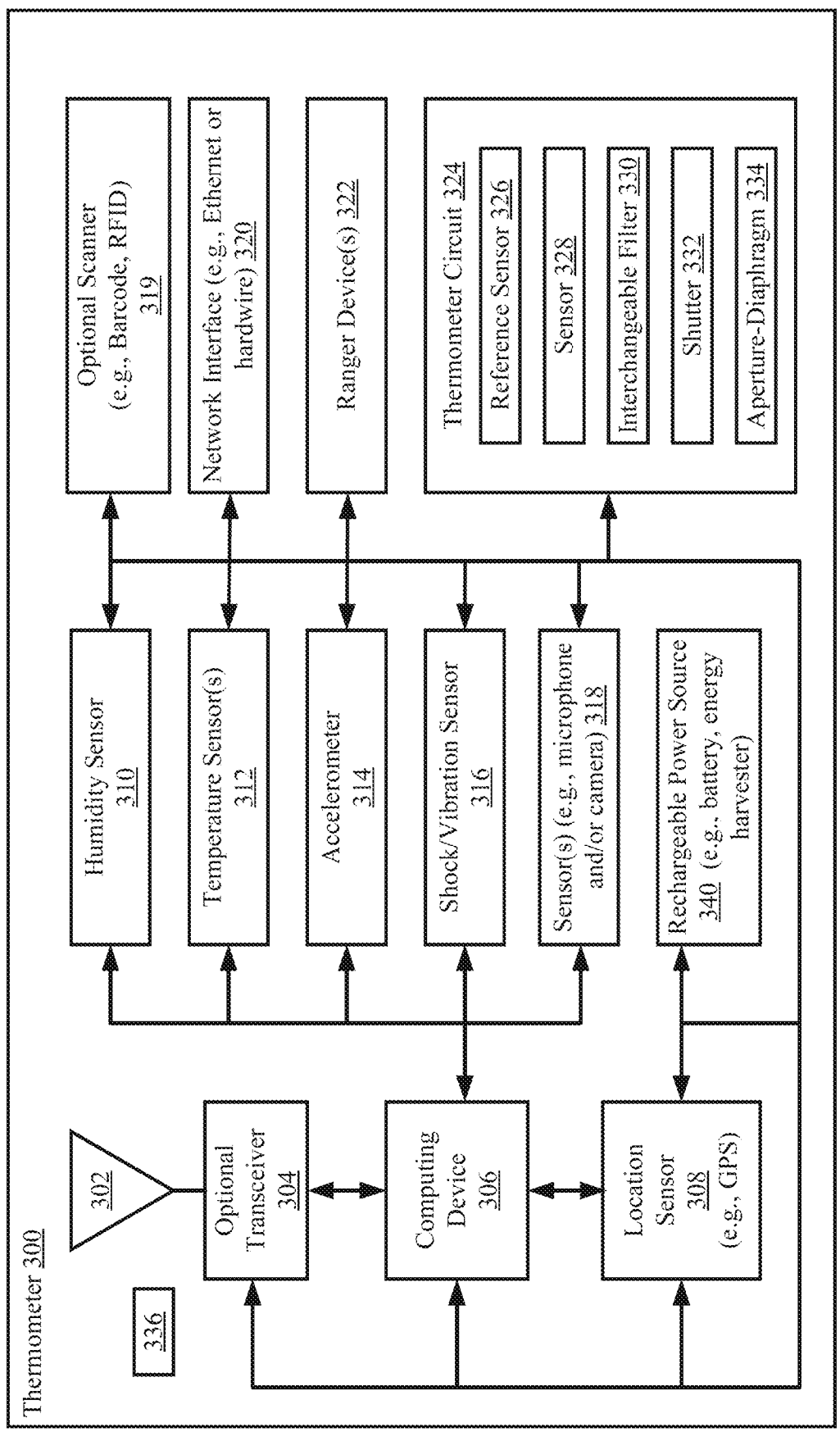
FIG. 3 provides an illustration of an illustrative architecture for a thermometer.

Referring now to FIG. 3, there is provided an illustration of an illustrative architecture for a thermometer 300. Thermometers 102, 120 of FIG. 1 and 202-218 of FIG. 2 are the same as or similar to thermometer 300. As such, the discussion of thermometer 300 is sufficient for understanding thermometers 102, 120 of FIG. 1 and 202-218 of FIG. 2.

Thermometer 300 is generally configured to measure temperatures of individuals located in proximity thereto. In some scenarios, temperature measurements can be taken at multiple locations on the individual's body in accordance with a given application (e.g., use in analytics for different patient groups), based on a group classification associated with the individual, and/or based on a medical diagnosis for the individual. For example, temperature measurements can be taken at different locations on the individual's body where the individual is suffering from certain hypothermic or hyperthermic conditions and/or where valuable insight may be gained from temperature measurements at different locations on the surface of the patient. A location on the individual's body can be determined and/or validated prior to when a temperature measurement is made by the thermometer.

A distance to a surface of the individual's body can also be determined and/or used by the thermometer to assist with targeting sites at which temperature measurements or other sensor data is to be generated. Imaging technology can be used to facilitate the location and/or distance measurements. The detected distances can be used to selectively and/or dynamically change the sensitivity of the temperature sensors. For example, the sensitivity of the temperature sensor(s) can be minimized or otherwise changed in accordance with a change in distance to the individual when within an acceptable range of distances (which balances offset with distance), with collection of sensor information from a larger target area of the individual's body.

Thermometer 300 may act as an ambient temperature monitoring device in the background even when not in normal use for body temperature measurements. This is useful to detect and/or flag extreme changes in the ambient temperatures outside of the desired temperature range within the environment (e.g., the hospital ward, clinic, etc.). If the environment is an indoor environment, then the temperature of the indoor environment may be controlled via any known or to be known Heating, Ventilation and Air Conditioning (HVAC) system (e.g., system 150 of FIG. 1). This would include giving warnings according to predefined threshold values for upper and lower acceptable limits (for example, a low limit threshold value is equal to 35° C. (or 95° F.) and an upper limit threshold value is equal to 38° C. (or 100.4° F.)). In effect, the thermometer 300 may facilitate adjustments to HVAC operations for heating or cooling the indoor environment and/or notifying personnel of possible improper operation of the HVAC system. For example, the ambient temperature measurement(s) can be wirelessly communicated from the thermometer 300 to the HVAC system. The HVAC system can then adjust its operations based on the ambient temperature measurement(s) in accordance with known techniques. The present solution is not limited to the particulars of this example. The thermometer 300 may also measure other environmental parameters such as carbon dioxide levels and/or amounts of other gases present in the environment. The measurements can be used to address various health related issues associated with elderly individuals at a retirement home. The measurements may be logged again users of the thermometer to build a picture of their environments and then identify any variations or trends over the readings.

Additionally or alternatively, thermometer 300 may be: configurable and used as a special purpose hypothermic device by having a hypothermic mode of operation where it would operate accurately in the 30° C. to 34° C. (or 86° F. to 93.2° F.) temperature range and/or the 40° C. to 42° C. (or 104° F. to 107° F.) temperature range; configurable and used as a special purpose hyperthermic device by having a hyperthermic mode of operation where it would operate accurately in temperatures equal to or greater than 40° C. (or 104° F.); configured to have at least a contact surface that is partially made with an anti-microbial material to minimize infection spread through surface contact; and/or configured to have special tight-fitting seals to minimize capture of contaminants (for example, body fluids and/or cleaning fluids). Conventional thermometers typically do not produce accurate body temperature measurements in the stated ranges (i.e., 30° C. to 34° and 40° C. to 42° C.). This improved accuracy in the hypothermic mode of the thermometer 300 is at least facilitated by the thermometer's ability to selectively and dynamically change its sensors sensitivities and/or add/subtract offset amounts from body temperature measurements. The offset amounts can be selected based on patterns in sensor data detected by machine learning models and/or by user software interactions with the thermometer 300. The patterns can indicate, for example, different disease states or age ranges such as neonates, Pediatric Active Enhanced Diseases (PAED), and/or elderly.

Additionally or alternatively, a locking mechanism may be provided with the thermometer 300 to make for convenient change of power sources (e.g., batteries) but minimize the chances of breakages in plastic catches. Examples of such lock mechanisms include magnets, single twist screw clamps, screws, and/or a screw lid.

As shown in FIG. 3, the thermometer 300 comprises an optional antenna 302, an optional transceiver 304, a computing device 306, a location sensor 308, a humidity sensor 310, a temperature sensor 312, an accelerometer 314, a shock/vibration sensor 316, other sensor(s) 318 (e.g., a microphone, a camera, a location device (e.g., GPS), a scent/smell sensor, a carbon dioxide sensor, and/or a gas sensor), an optional scanner 319, a network interface 320, range device(s) 322, a thermometer circuit 324, and a rechargeable power source 340. Notably, the thermometer 300 is designed such that operations of the listed component 308-319, 322 are optimized and unaffected by any object in contact with an external surface of the thermometer.

In some scenarios, the housing has an ergonomic design and/or is provided with a collection hood accessory to facilitate (i) easy holding and alignment to a target surface being measured and/or (ii) allow for individuals to carry out measurements on themselves. For example, the housing could have an arced body shape and/or an elongated body shape which linearly aligns towards target surface (for example, as shown in FIG. 2). The housing of the thermometer could additionally be provided with a grip portion so that a user can grip/hold the thermometer at a location and in a manner selected to facilitate optimized performance of component 308-319 and/or 322, as well as ensure that the user's physical conditions (e.g., temperature and/or applied force to the housing) does not impact operations of the same. For example, the grip/handle portion is located on the housing so that a camera's Field of View (FOV) is not obstructed by a human body. The housing may also be designed to minimize thermal influences on sensor(s) (such as from the warm hand holding the device) by use of materials with low thermal conductivity, an elongated housing which increased distance between the sensor(s) and a source of heat (e.g., human body part, barcode scanner, display electronics, warm objects in locale other than the patient forehead), low thermal conductivity support pillars/brackets for holding PCB(s) internally within the housing, and/or thermal isolation feet on the base of the housing for resting position on benches, docking stations, and so on. The grip portion may additionally or alternatively be designed with a tilt sensor to sense an angle of the thermometer relative to a reference point. For example, in some scenarios, the thermometer can be placed at four different spot locations on an individual's forehead to obtain angle measurements via the tilt sensor. The angle measurements can be analyzed to detect any distortion after imaging with a camera.

The antenna 302 and transceiver 304 are provided to facilitate wireless communications with external devices via wireless technology (e.g., RF technology). The antenna 302 is configured to receive wireless signals from the external device and transmit wireless signals generated by the transceiver 304. Transceivers are well known in the art, and therefore will not be described herein.

The computing device 306 is connected to the transceiver 304 and configured to pass information to the transceiver 304 for encoding and modulating into a wireless signal. The wireless signal is provided from the transceiver 304 to the antenna 302 for transmission from the thermometer 300 to an external device (e.g., device 106, 110, 114 and/or 122 of FIG. 1). This information can include, but is not limited to, measured temperature values, alerts, and/or notifications.

The transceiver 304 is also configured to demodulate and decode wireless signals received from external device(s) (e.g., device 106, 110, 114 and/or 122 of FIG. 1). The transceiver 304 is coupled to a computing device 306 and provides the decoded signal information to the computing device 306. The computing device 306 uses the decoded wireless signal information in accordance with the function(s) of the thermometer 300. The decoded signal information can include, but is not limited to, a request for certain information, and/or commands for controlling operations of the thermometer 300.

The network interface 320 is configured to facilitate wired communications to and from external devices (e.g., network nodes such as access points, etc.). Such network interfaces are well known in the art.

The location sensor 308 is configured to determine a location of the thermometer. The location sensor can include, but is not limited to, a Global Positioning System (GPS) sensor and/or a beacon signal transceiver. The location sensor can facilitate device tracking for a number of reasons (e.g., for tracking the thermometer's location in a hospital or other environment, at home monitoring, and/or asset management). The device tracking can additionally or alternatively be facilitated using signals from local hubs in buildings or other local environments, and/or wireless signal strengths from cellular towers or base stations. The wireless signals can include, but are not limited to, SRC signals and/or LRC signals.

The ranger device(s) 322 is(are) configured to measure a distance from the thermometer 300 to a person or other object in proximity thereto. The distance is determined via a signal Time of Flight (TOF) technique (e.g., using RF signals and/or acoustic signals), an optical technique, a laser pulse technique, a radar technique, and/or other technique. Each of the listed techniques are well known in the art. Acoustic and/or optical technology can be employed by the ranger device(s) 322. For example, the ranger device(s) 322 can estimate a distance to a target location/spot on a target individual and align with the target location/spot to ensure optimum positioning of the thermometer 300 for taking a temperature measurement or generating other sensor data. This may be automated to allow measurements to proceed when correct conditions exist within predefined thresholds. The alignment can be between the ranger device(s) 322 and the target location/spot, and/or between thermometer circuit 324 and the target location/spot. The alignment can be achieved without assistance from a user of the thermometer. In this regard, the alignment is automated by enabling or otherwise operating mechanisms 336 for rotating or otherwise changing a position of at least a portion (e.g., sensors 328) of the thermometer circuit 324. The mechanisms 336 can include, but are not limited to, motors, gears and/or materials that change shape when an electrical signal is applied thereto.

The humidity sensor 310 is configured to measure the humidity in an environment external to the thermometer 300 and/or an environment internal to the thermometer 300. The temperature sensor(s) 312 is(are) configured to measure temperature(s) of internal component(s) of the thermometer 300, measure a temperature of an internal environment of the thermometer 300, and/or measure a temperature of an external environment of the thermometer 300. The accelerometer 314 is configured to measure acceleration of the thermometer 300. The shock/vibration sensor 316 is configured to record shocks and/or vibrations over a defined period of time. The sensor data generated by sensors 310-316 can be stored, accessed, processed and used by the computing device 306 in accordance with operations of the thermometer 300. Feedback may be provided to a user when a temperature reading exceeds a threshold value.

The other sensor(s) 318 can include, but are not limited to, a microphone, a camera, and/or an airflow sensor. In the camera scenario, the computing device 306 may be configured to perform image processing using images captured by the camera. This image processing can be performed, for example, to obtain codes printed on or otherwise disposed on an item. The code can include, but is not limited to, a barcode. In the airflow sensor scenario, the sensor 318 can detect changes in temperature and/or airflows inside and/or around the thermometer 300 and/or individual having his (her) temperature taken. For example, sensor data generated by sensor 318 can be used by computing device 306 to detect the presence of an enabled fan in proximity to the thermometer 300 and/or individual. The sensor 318 can be disposed on the outside of the housing and/or within the sidewalls of the housing. Operation of the thermometer can be adjusted to account for the enabled fan's expected effects to temperature measurements. The present solution is not limited to the particulars of this example.

The scanner 319 can comprise a barcode scanner, an RFID tag scanner and/or a video camera. Barcode scanners and RFID tag scanners are well known in the art, and therefore will not be described herein. Any known or to be known barcode scanner and/or RFID tag scanner can be used herein without limitation. The scanner 319 is generally configured to scan an item or object to obtain at least one code therefrom. The code can include, but is not limited to, a barcode and/or a Unique Product Code (UPC). The scanner 319 can be disposed on and/or in the housing of the thermometer 300 to be located and directed to minimize discomfort to users and/or other nearby individual(s). For example, the scanner 319 can be located relative to the housing and/or other components of the thermometer to ensure that there is a minimal likelihood that light will be directed into eyes of the user and/or other nearby individual(s).

The thermometer circuit 324 can comprise one or more of a reference sensor 326, a sensor 328, interchangeable filter(s) 330, a shutter 332 and/or an aperture-diaphragm 334. The thermometer circuit 324 is configured to measure a temperature of an individual (e.g., individual 124 of FIG. 1) in proximity to the thermometer 300. The temperature can be measured in accordance with one or more techniques. The techniques can include, but are not limited to, a shutter-based technique, a multi-temperature sensor-based technique and/or an interchangeable filter-based technique. The shutter-based technique involves: closing shutter and operating the sensor 328 to obtain a reference temperature measurement; and opening the shutter 332 and operating the sensor 328 to obtain a real temperature measurement. The multi-temperature sensor-based technique involves using the reference sensor 326 to obtain a reference temperature measurement, and using senor 328 to obtained a real temperature measurement (at the same time or sequentially in a relatively short time). The interchangeable filter-based technique involves: using interchangeable filters 330 to analyze different band passes; and performing a ratio metric analysis to determine a temperature measurement. This filter approach is an iterative process because the filters need to be interchanged at least once to obtain at least two band pass readings. The filters can be interchanged automatically via actuation of mechanical means (e.g., motors, gear, tracks, grippers, posts, bars, latches, magnets, springs, etc.) or manually by an individual. Individuals may have spectral signatures—visible and infrared—that can be detected and used to facilitate improved medical care of the same. The thermometer may be configured to detect these spectral signatures.

In scenarios where two or more techniques are implemented in the thermometer circuit 234, the thermometer is configured to select one of the techniques and/or cause the thermometer to transition between temperature measurement techniques based on certain criteria and/or trigger events. The criteria can include, but is not limited to, values included in sensor data (e.g., temperature, vibration, shock, smell, sound, carbon dioxide levels, gas levels, etc.), conditions (e.g., temperature, humidity, etc.) of an environment internal to the thermometer, conditions (e.g., temperature, humidity, etc.) of an environment external to the thermometer, distance between thermometer and individual, body part closest to thermometer (detected by thermometer using, for example, image processing), and/or medical conditions of the individual who's temperature is to be measured (e.g., diabetic vs. hypothermic). Machine learning can be used here to learn patterns and/or combinations of the listed criteria which indicated a given one of the techniques is optimal. The trigger events can include, but are not limited to, a user-software interaction, depression or other actuation of a input device (e.g., a button), and/or movement of the thermometer into a specific geographic location.

It should be noted that the thermometer circuit 324 can implement one or more of the described techniques. In scenarios where two or more of the described techniques are employed, the computing device 306 can select which technique to use at a given time based on user inputs, sensor data generated by sensors 310-318, and/or other information. The computing device 306 can select or change the technique in response to a trigger event (e.g., a temperature measurement exceeding a threshold value and/or a change in sensitivity of the thermometer via aperture 334). Aperture 334 can provide a means to dynamically adjust the sensitivity of the thermometer circuit to temperature(s) and/or temperature variations. For example, the overall size of aperture 334 can be adjusted (for example, via a movable vent) to vary the sensitivity of the thermometer to temperature(s) and/or temperature variations. This sensitivity adjustment feature can facilitate different modes of operations to achieve improved performance for patients or other individuals with different medical conditions (e.g., a hypothermic patient and/or a diabetic patient).

The power source 340 can comprise, but is not limited to, a rechargeable battery, super capacitors, a recharging connection port, isolation filters (e.g., inductors and ferrite-based components), a voltage regulator circuit, and/or a power plane (e.g., a circuit board layer dedicated to power). The port source 340 can be charged and/or recharged via a direct connection to an external power source (e.g., an AC mains) and/or via a docking/charging station (e.g., docking/charging station 116 of FIG. 1). The power source 340 can also comprise an energy harvesting circuit for charging and/or recharging a super capacitor and/or battery using collected energy (e.g., light, RF energy, etc.).

Computing device 306 may be configured to: perform system checks and monitoring on regular time basis to alert for key times and dates (e.g., warranty date(s), calibration date(s), recalibration date(s), etc.); and/or perform self and automated diagnostics for checking the thermometer functions and performance. These diagnostics can be achieved using machine learning algorithms in which patterns of measurements from the diagnostic sensors are learned and can be used to identify possible failure modes. The diagnostic sensors can include, but are not limited to, temperature monitors, shock detectors, humidity sensors, main sensors, reference sensors, auxiliary sensors, location sensors, vibration sensors, and/or magnetic field sensors. The failure modes can include, but are not limited to, fixed high or fixed low readings, no main reading, and/or a fixed reading irrespective of changing temperature environment (e.g., humidity and/or moisture readings). This information may additionally or alternatively be used to train the thermometer to detect certain parameters associated with individuals and dynamically generate instructions for using the thermometer based on the detected parameters. The instructions may be output from the thermometer to the user (auditorily, visually and/or tactually).

Computing device 306 may be configured to facilitate personalized diagnostic monitoring for patients—generating a baseline for an individual patient, monitoring trends over a series of measurements for an individual, in effect personalized temperature tracking and/or spectral signature detection. This personalized diagnostic monitoring feature can be extended to different patient groups (e.g., geriatric, neonatal, children, diabetics, etc.). Computing device 306 may be configured to provide on-system training, guidance and/or help aids that can be prompted and/or output to a user of the thermometer 300 (e.g., via a display). The training can provide instructions on how to use the thermometer 300 and/or operational controls. The training can be facilitated by basic tutorials. This may be facilitated with the use of the scanning capability of barcodes and QR codes to pull information stored in memory of computing device.

The computing device 306 may be configured to monitor frequencies of sensor measurements and detect when temperature profiles are being met based on the monitored frequencies, sensor data and/or diagnostic information. The temperature profiles can be learned by the thermometer 300 using machine learning algorithms and/or Artificial Intelligence (AI) programs. The machine learning algorithms and/or AI program can be trained and/or operable to ascertain when it is optimum or suitable to take a next sensor measurement. This would get around the problem of sensor measurements occurring too frequently to cause some internal heating and/or insufficient time for re-equilibration.

The computing device 306 may incorporate a means of detecting and monitoring excessive moisture on the forehead or other skin location which impact the accuracy of the temperature measurements. The means may assess for spectral profile emanating from the surface at various wavelengths. This may give a warning and guide to wipe forehead or other surface prior to when a temperature measurement is performed.

The computing device 306 and camera 318 (or other imaging device) can be used to monitor the complexion of the skin surface and assess the type of skin in terms of pigmentation and texture. This can be done with the camera 318 (or other imaging device) operating in the visible-NIR region. This skin information can be used to validate or otherwise check the acceptability of temperature measurement values. For example, a person's skin often has a red or pink tone when the person has a fever or otherwise has an elevated body temperature. A relatively high temperature measurement (for example, one greater than a normal body temperature of 37° C. (or 98.6° F.) or between 36.1° C. to 37.2° C. (or 97° F. to 99° F.)) is considered valid, accurate or acceptable when the skin has a red or pink tone and is considered invalid, inaccurate or unacceptable when the skin has a normal tone for the person or matches a reference tone (for example, by a certain degree). The person may have a particular skin texture (for example, bumps, rashes, etc.) when having a certain medical condition. The temperature measurement value(s) can be checked or validated based on the person's skin texture and/or known medical condition. Other criteria can be used in addition to or as an alternative to skin tone, skin texture and/or medical condition to check or validate temperature measurement values. If two or more criteria are used, then the criteria may be weighted. The present solution is not limited to the particulars of this example.

Figure 4:
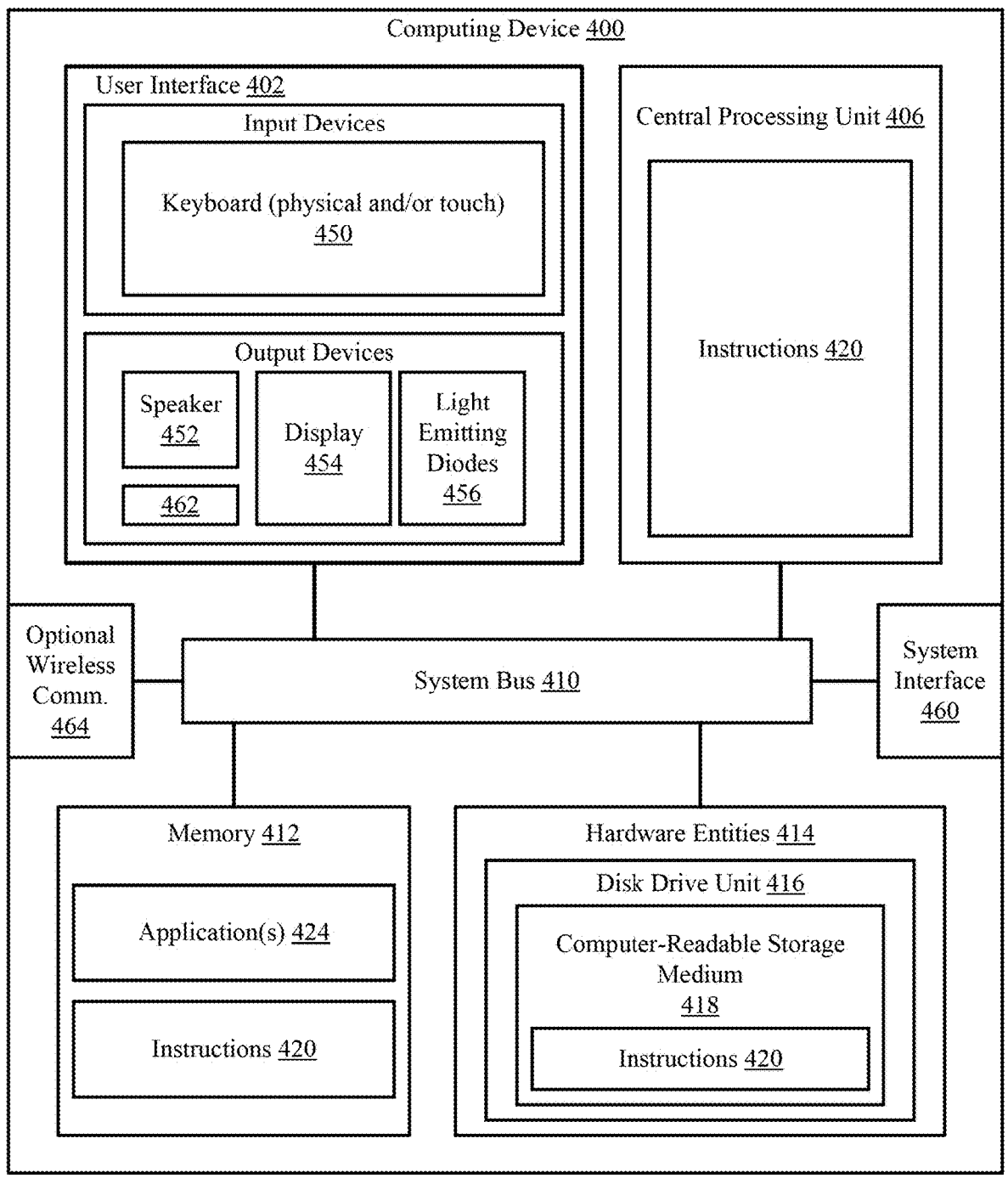
FIG. 4 provides an illustration of an illustrative architecture for a computing device.

Referring now to FIG. 4, there is provided an illustration of an illustrative architecture for a computing device 400. The computing device(s) 106, 114 of FIG. 1, server 110 of FIG. 1 and/or the computing device 306 of FIG. 3 is/are the same as or similar to computing device 400. As such, the discussion of computing device 400 is sufficient for understanding the devices 106, 110, 114 of FIG. 1 and the computing device 306 of FIG. 3.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a thermometer and/or processing data, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, an optional wireless communication device 464, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, light emitting diodes 456, and/or a haptic feedback device 462. The haptic feedback device 462 is configured to provide haptic feedback to a user of the computing device. The haptic feedback can include, but is not limited to, tactile feedback, visual feedback and/or auditory feedback. The haptic feedback can be provided, for example, when a measured temperature exceeds a threshold temperature.

System interface 460 is configured to facilitate wired and/or wireless communications to and from external devices (e.g., network nodes such as access points, etc.). In some scenarios, the wireless communication device 464 is provided in addition to the system interface 460 for facilitating wireless communications to and from external devices. If both components 460 and 464 are wireless communication enabled, then they may employ different wireless communication technology.

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Illustrative Methods

Figure 14:
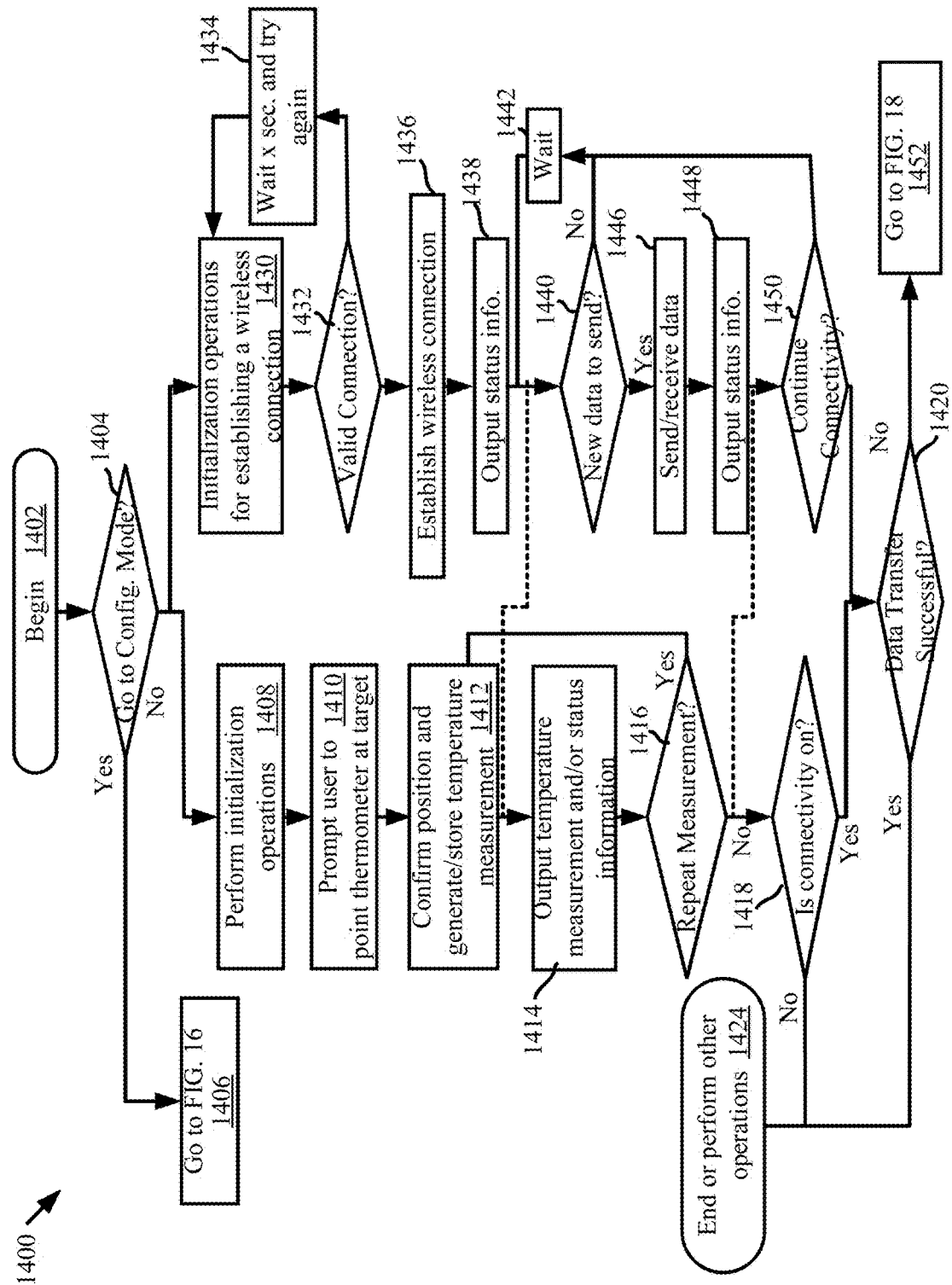
FIG. 14 provides a flow diagram of an illustrative method for operating a thermometer.

Referring now to FIG. 14, there is provided a flow diagram of an illustrative method 1400 for operating a thermometer (e.g., thermometer 102 or 120 of FIG. 1). Method 1400 begins with 1402 where a user depresses or otherwise actuates an "on/off" button of a thermometer (e.g., thermometer 102 or 120 of FIG. 1). In response to the actuation of the "on/off" button, the thermometer performs operations to (i) determine the duration of time that the "on/off" button is actuated and (ii) determine whether the duration of time exceeds a threshold value (e.g., 5 seconds). If the duration of time does exceed the threshold value [1404: YES], then the thermometer is transitioned into a configuration mode and continues the setting operations of FIG. 16 (which will be described below).

In contrast, if the duration of time does not exceed the threshold value [1404: NO], then method 1400 continues with a temperature measurement mode. Operations 1408-1424 of a first branch and operations 1430-1452 of a second branch may be performed in parallel during the temperature measurement mode of the thermometer. In some scenarios where wireless communications of the thermometer are disabled, operations 1430-1452 would not be performed.

The operations of the first branch generally involve performing the following operations by the thermometer: performing initialization operations at 1408 (e.g., boot sequence performed, display illuminated, key information output (e.g., battery status, mode setting, parameter setting(s), device status (e.g., ready to take temperature measurement), etc.); prompting the user in 1410 to point the thermometer at a target individual (e.g., individual 124 of FIG. 1); and confirming in 1412 that the thermometer is pointed at the target individual. Such confirmation can be made based on a user input and/or sensor data generated by sensors (e.g., sensors 318 of FIG. 3) of the thermometer. For example, the sensor data comprise an image captured by a local camera of thermometer that is processed to detect an object of a given type (e.g., a person) therein. If such confirmation is not obtained in a given amount of time (e.g., 10 seconds), then the thermometer may either return to 1410 or continue with 1424 where the process ends or other operations are performed. If such a confirmation is obtained in the given period of time, the thermometer generates a temperature measurement for the target individual (e.g., automatically or in response to a user input (e.g., button depression or actuation)), as shown by 1412.

The temperature measurement may be stored in 1412 in a local data store (e.g., memory 412 of FIG. 4) of the thermometer and/or in a remote datastore (e.g., datastore 112 of FIG. 1) external to the thermometer. In 1414, the thermometer outputs the temperature measurement and/or status information (e.g., via display 454 of FIG. 4). The status information may indicate whether the local and/or remote storage of the temperature measurement was successful.

Upon completing 1414, the thermometer determines in 1416 whether the temperature measurement should be repeated. This determination can be made based on a user input and/or automatically based on results from comparing the temperature measurement to threshold values. For example, if the temperature measurement falls outside of a given range of temperature values, then a determination can be made that the temperature measurement should be repeated. If the temperature measurement is to be repeated [1416: YES], then method 1400 returns to 1412. Otherwise [1416: NO], method 1400 continues with optional 1418.

In some scenarios, the wireless communication capability of the thermometer is disabled. Thus, the thermometer can perform a check at 1418 to determine whether or not the communication capability is enabled or disable. If disabled, then the thermometer may solicit a user input to enable the wireless communication capability of the thermometer. Alternatively, method 1400 continues with 1424 where the process ends or other operations are performed (e.g., the thermometer is turned "off"). If the wireless communication capability is enabled [1418: YES], then the thermometer can perform operations to confirm that the remote storage of the temperature measurement was successful. If so [1420: YES], then method 1400 continues with 1424. Otherwise, the thermometer begins a backup mitigation process shown in FIG. 18 (which will be described below), as shown by 1452.

Figure 5:
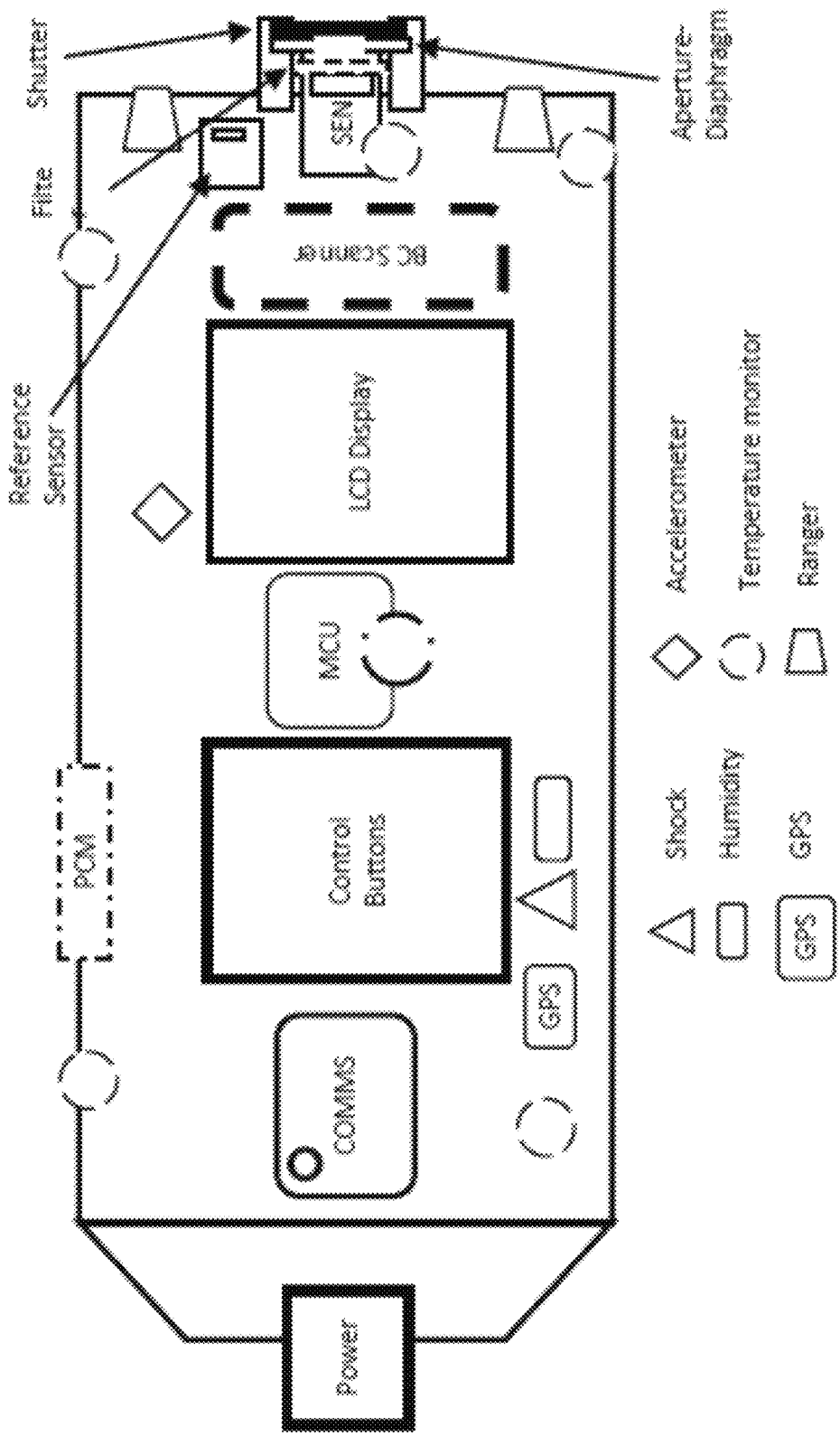
FIGS. 5-13 each provide an illustration of an illustrative board layout for a thermometer.
Figure 6:
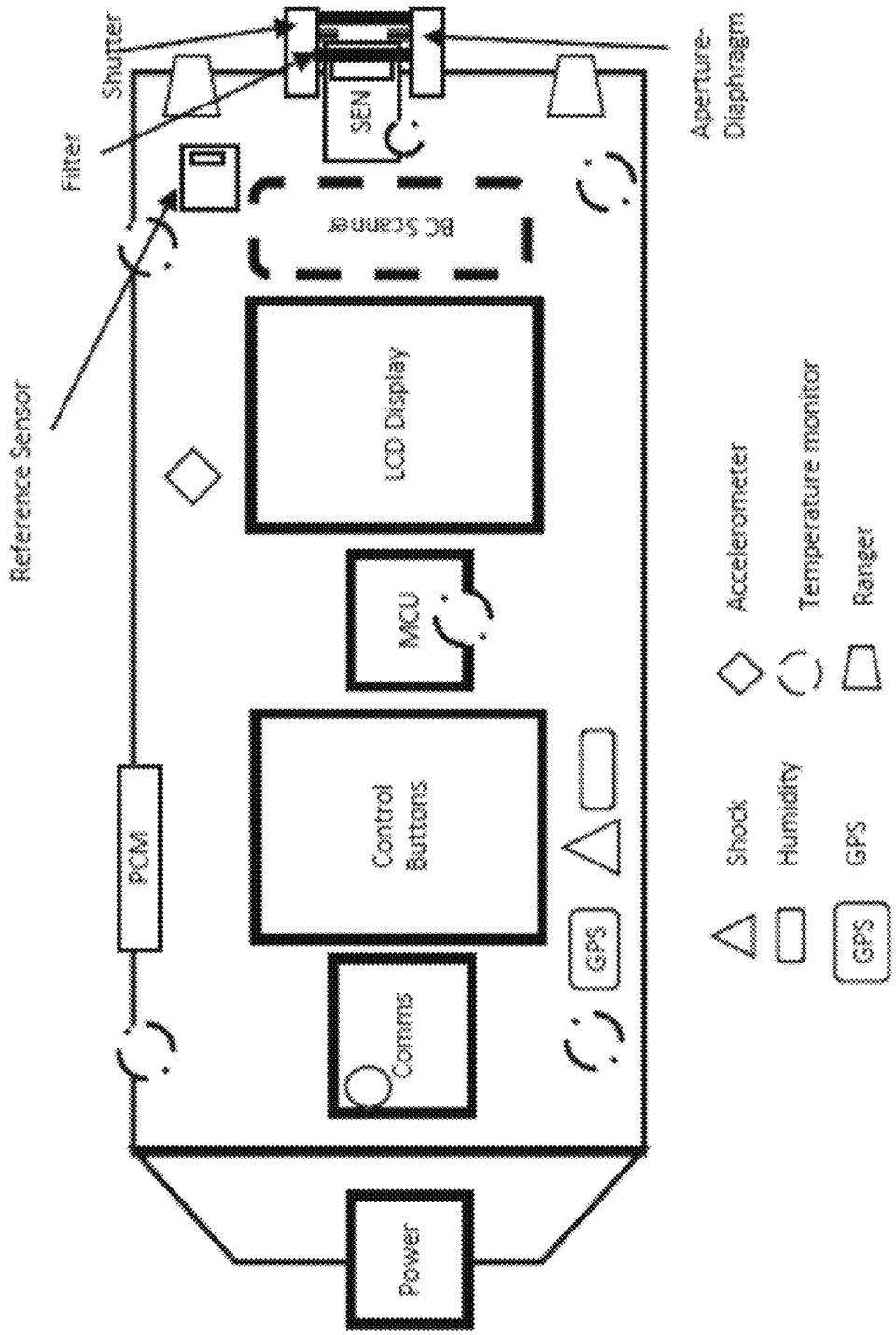
Figure 7:
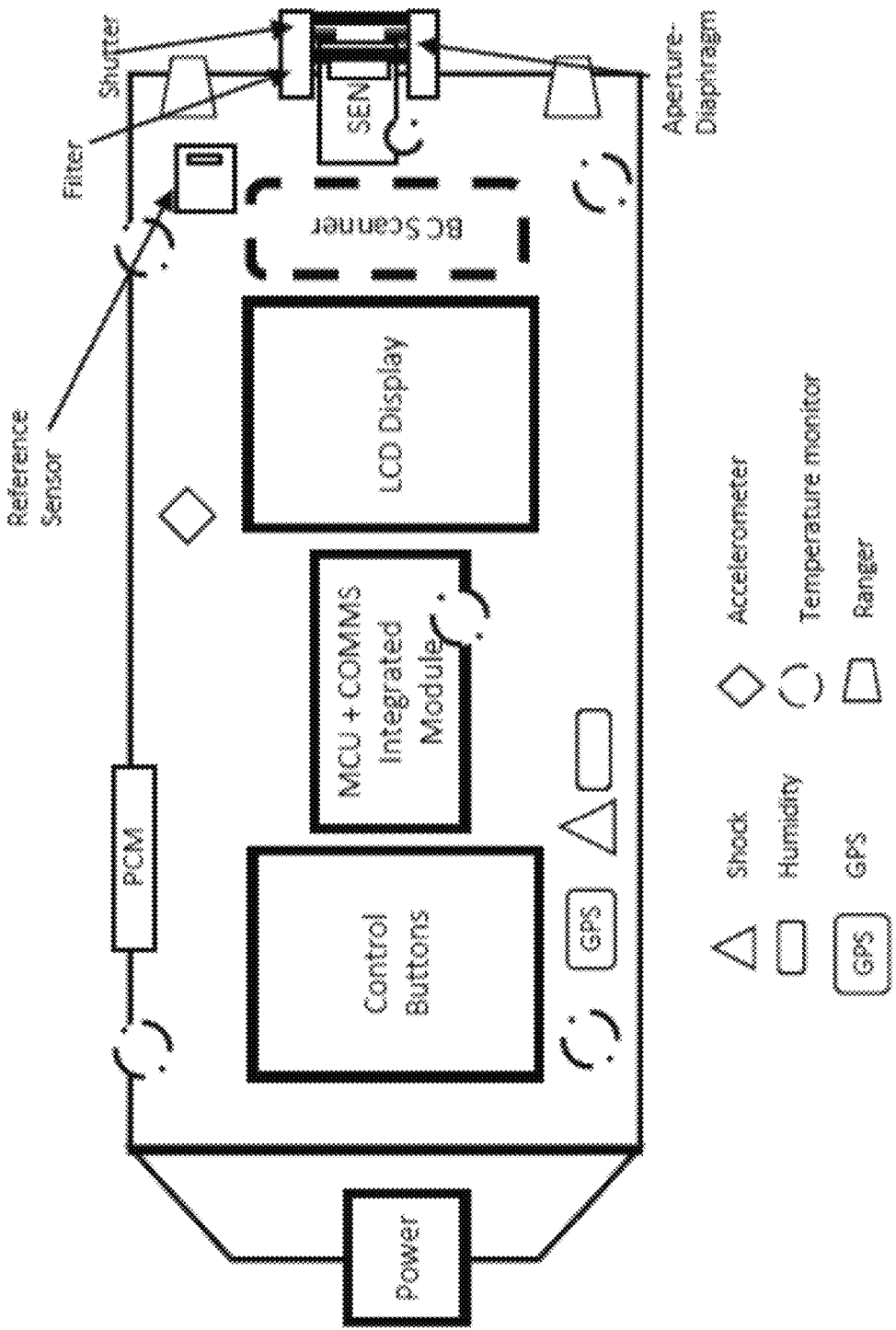
Figure 8:
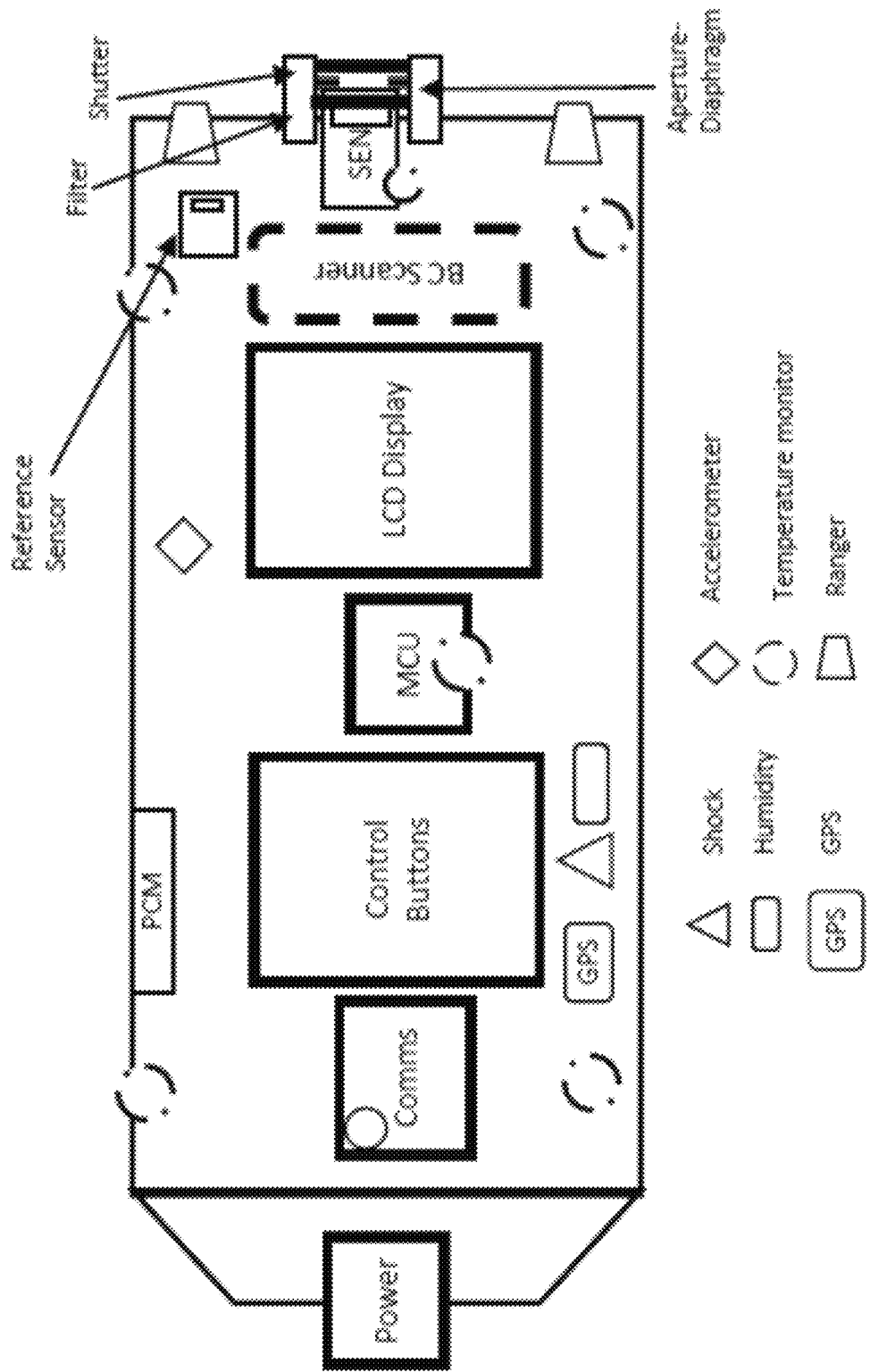
Figure 9:
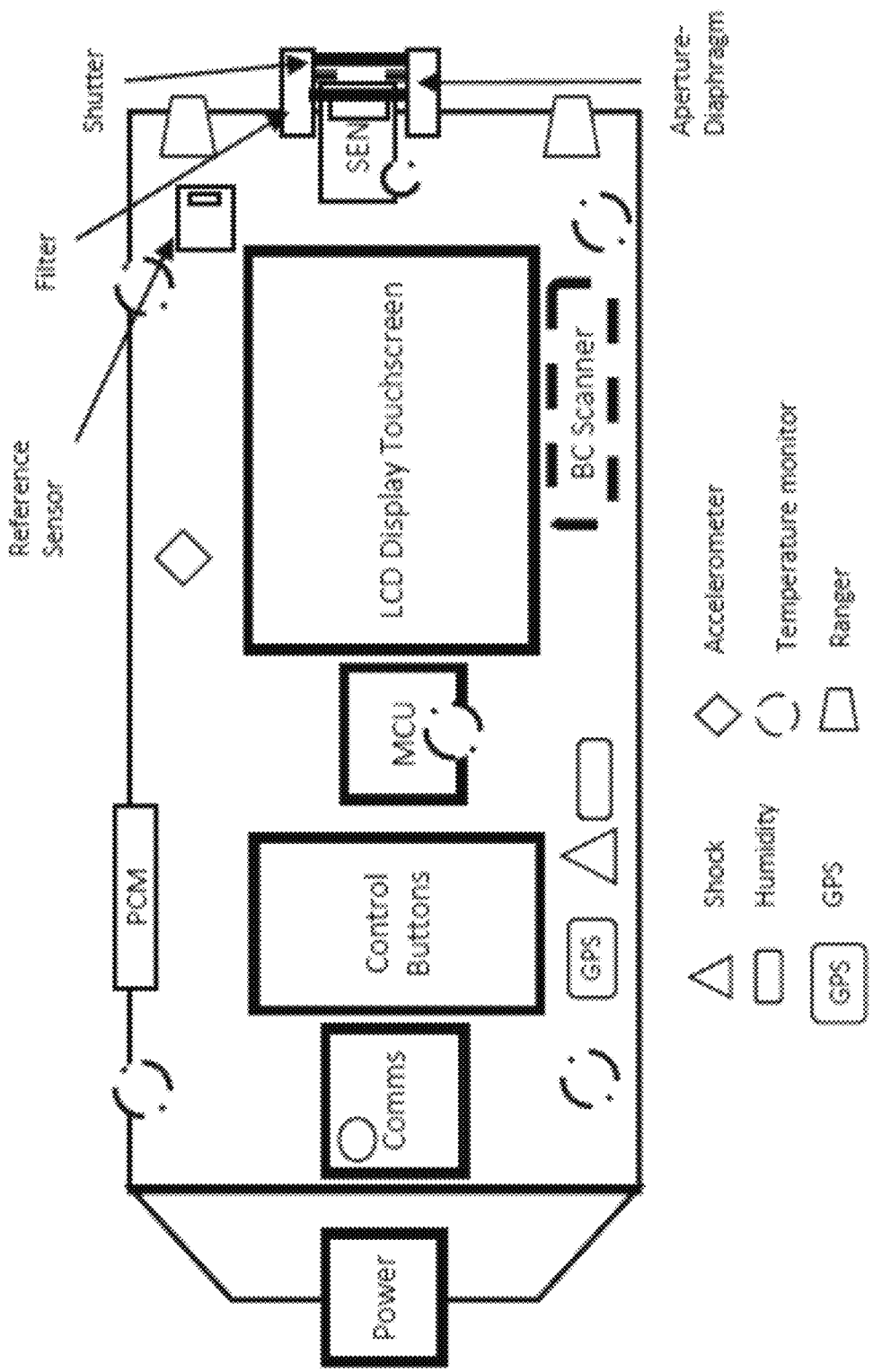
Figure 10:
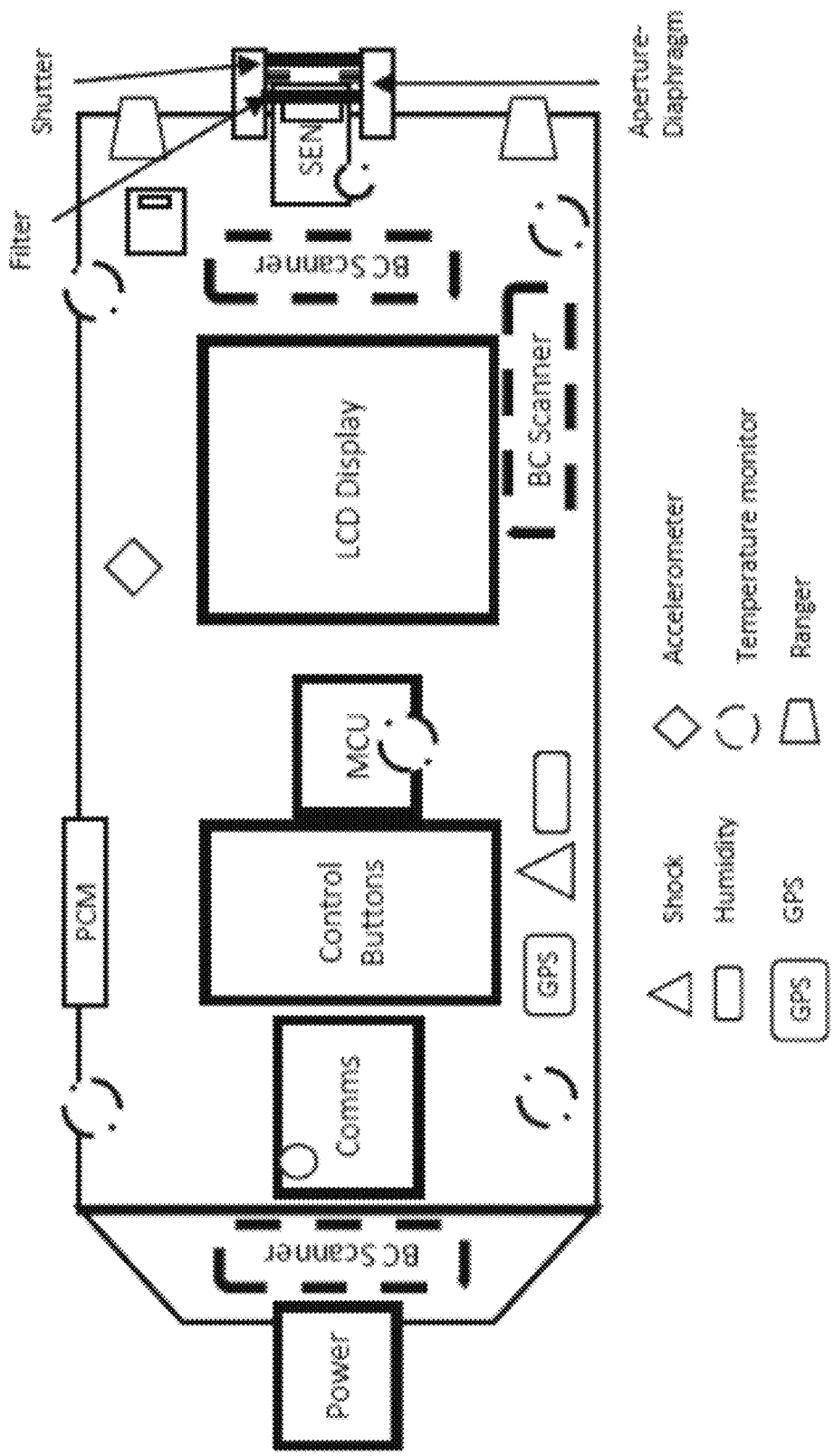
Figure 11:
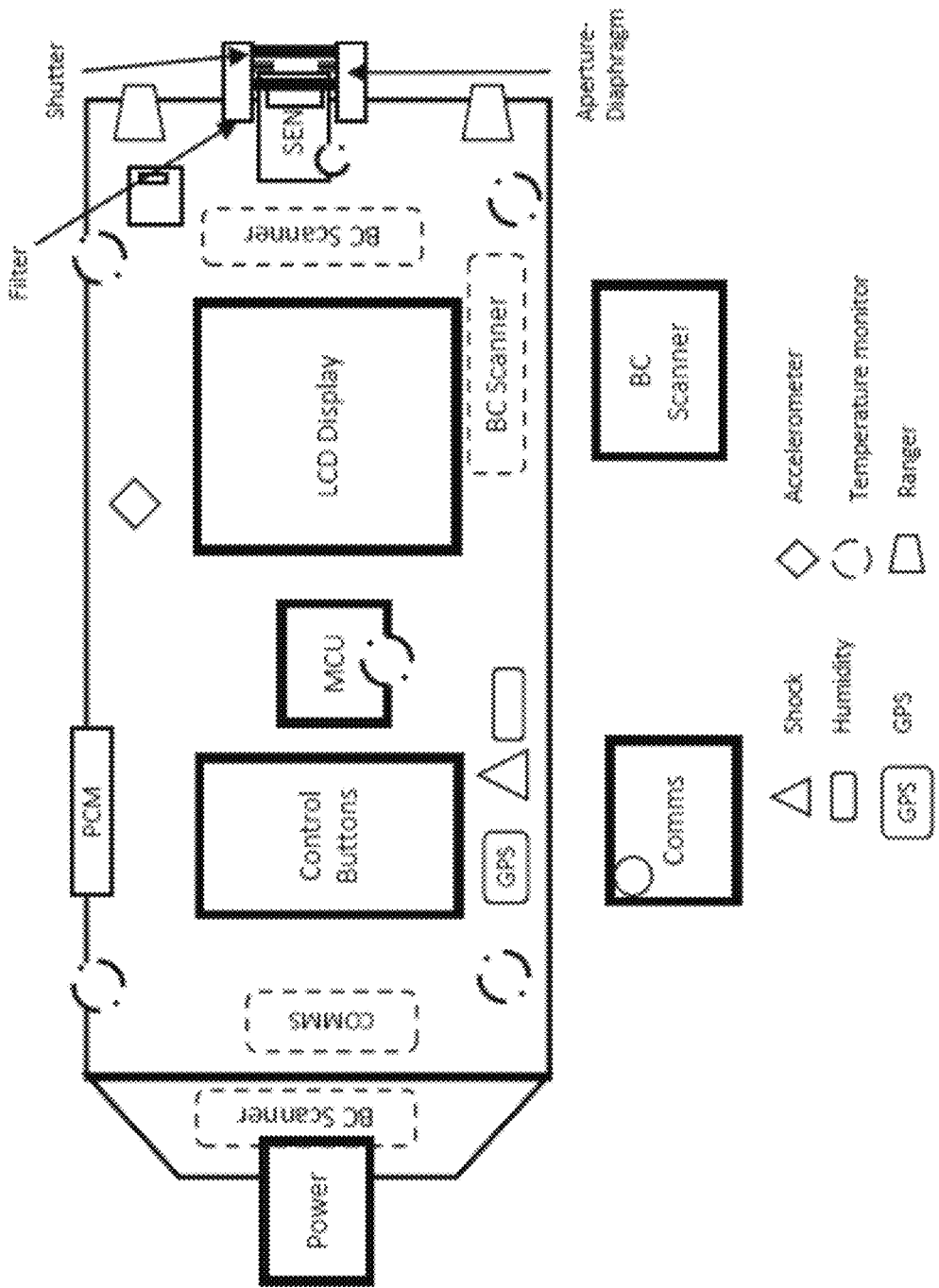
Figure 12:
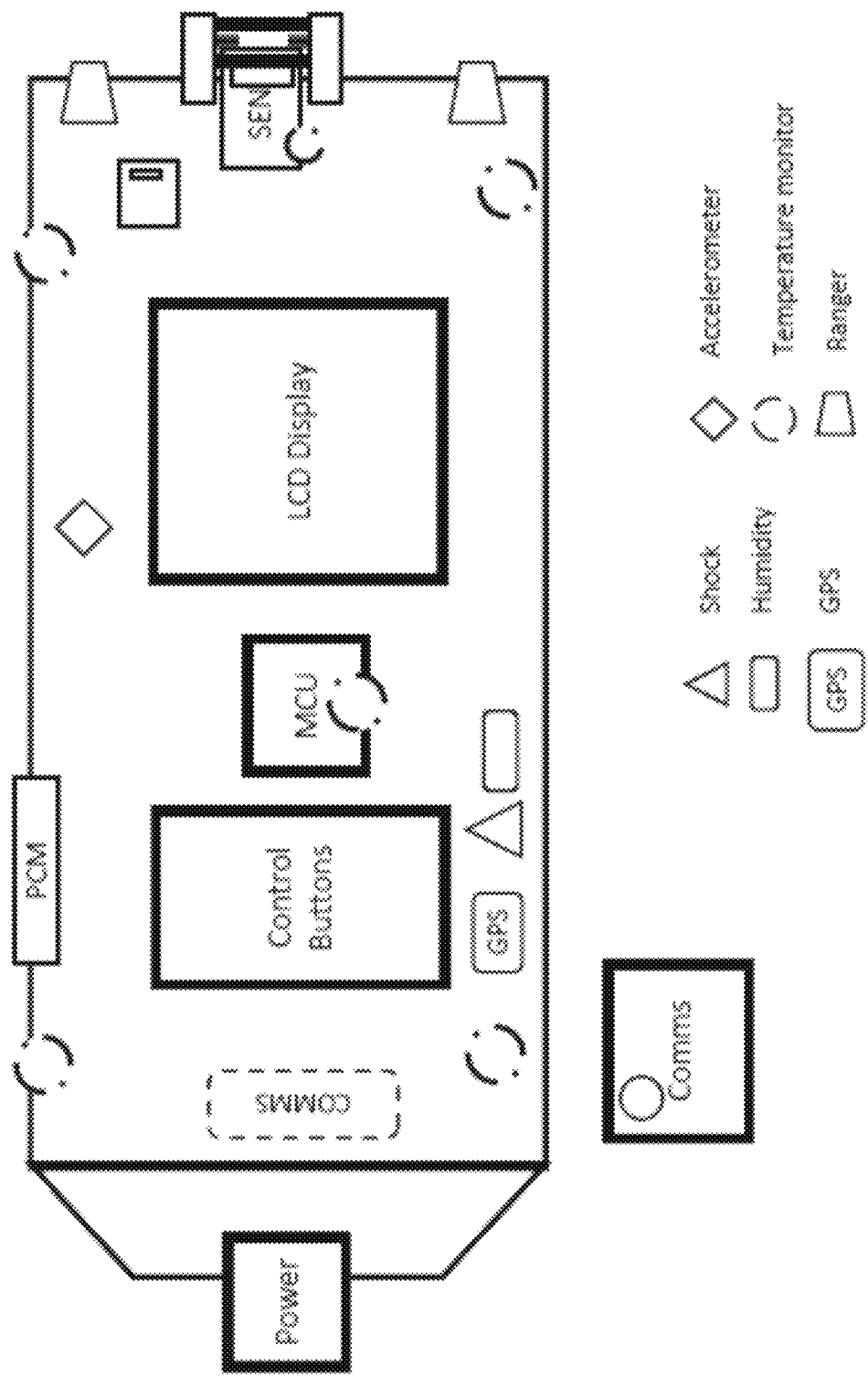
Figure 13:
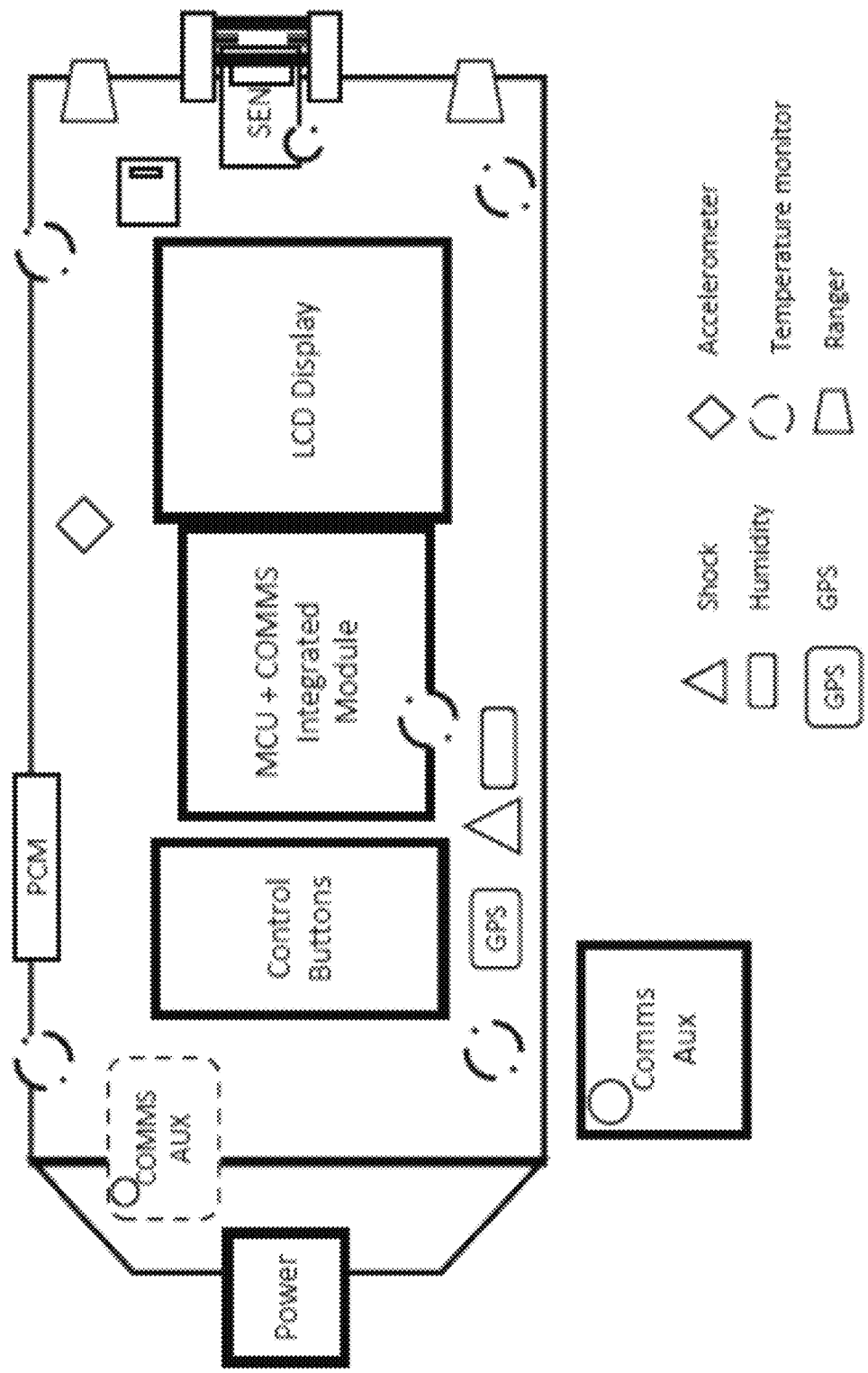

The operations of the second branch generally involve: initializing communication operations for establishing a communications link between the thermometer and an external device (e.g., client computing device 106 of FIG. 1, medical clinic computing device 114 of FIG. 1, and/or medical device 122 of FIG. 1). These operations are performed in functional blocks 1430-1436. The operations depend on the type of wireless communication being used by the thermometer. The thermometer may output status information to indicate whether or not the wireless connection was established between the thermometer and the external device (e.g., via display 454 of FIG. 5).

Next in 1440, the thermometer performs operations to determine whether there is any data to be sent therefrom. This determination can be made based on the values of flags set for the data stored in the local memory (e.g., memory 412 of FIG. 4). If not [1440: NO], then the thermometer waits for data to be sent. Otherwise [1440: YES], the thermometer performs operations in 1446 to retrieve the data from local memory, format the data for wireless transmission, and send the formatted data over the communication link established with the external device. An indication may optionally be output from the thermometer indicating that data is being transmitted therefrom.

The thermometer may also selectively continue or discontinue the wireless connection as shown by 1450. For example, if the temperature measurement was repeated, then the connection may be maintained so that a new temperature measurement is stored remote from the thermometer. In contrast, if the temperature measurement is not repeated, then the wireless communication capability can be disabled, for example, for power saving purposes.

Figure 15:
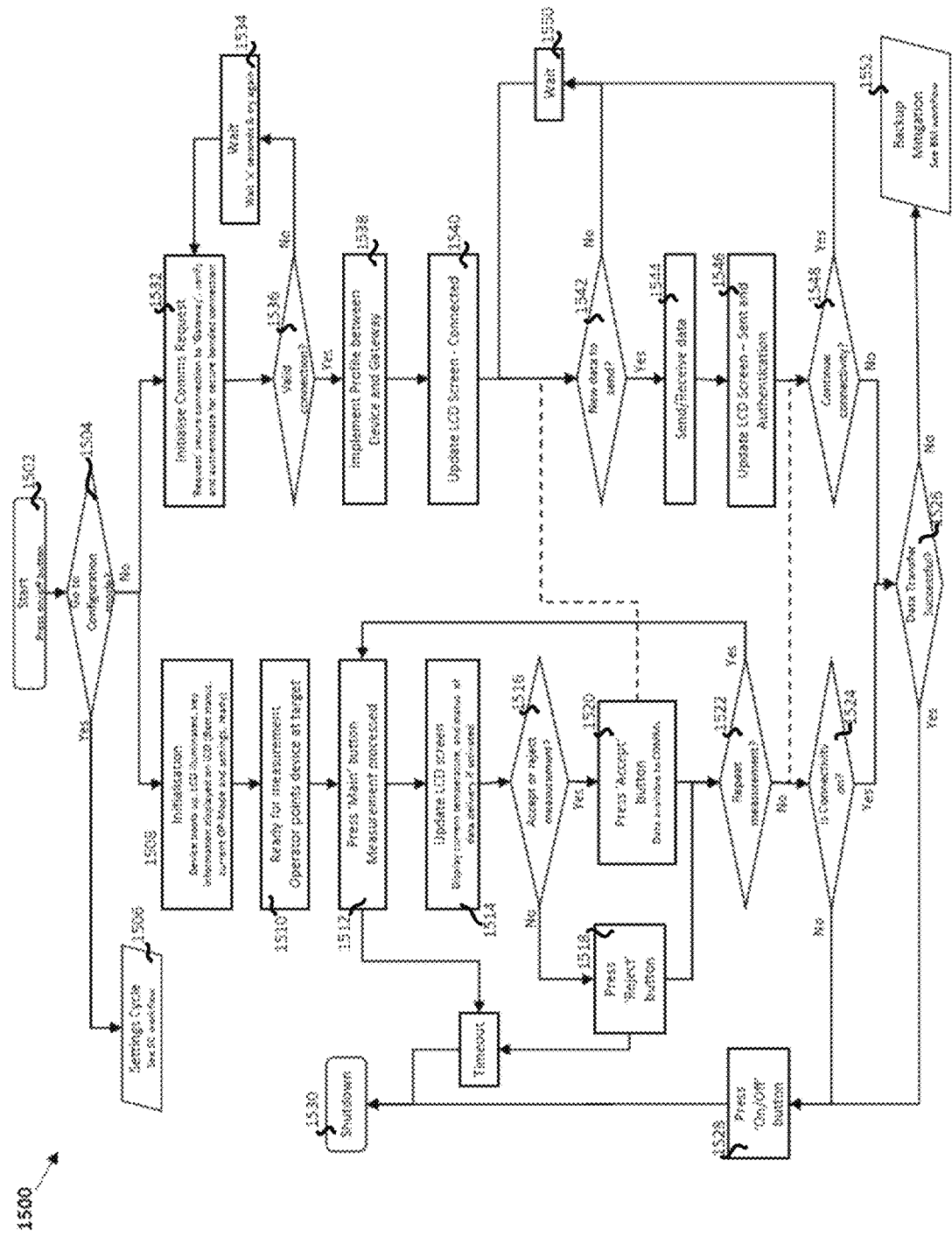
FIG. 15 provides a flow diagram of another illustrative method for operating a thermometer.

The present solution is not limited to method 1400. For example, as shown in FIG. 15, additional operations may be performed. In FIG. 15, operations 1502-1514, 1522-1530 are the same as or similar to operations 1402-1424 of FIG. 14. Similarly, operations 1532-1552 of FIG. 15 are the same as or similar to operations 1430-1452 of FIG. 14. The difference between FIG. 14 and FIG. 15 is the inclusion of additional operations 1516-1520 in which a user can be prompted and perform user-software interactions to accept or reject a temperature measurement.

Figure 16:
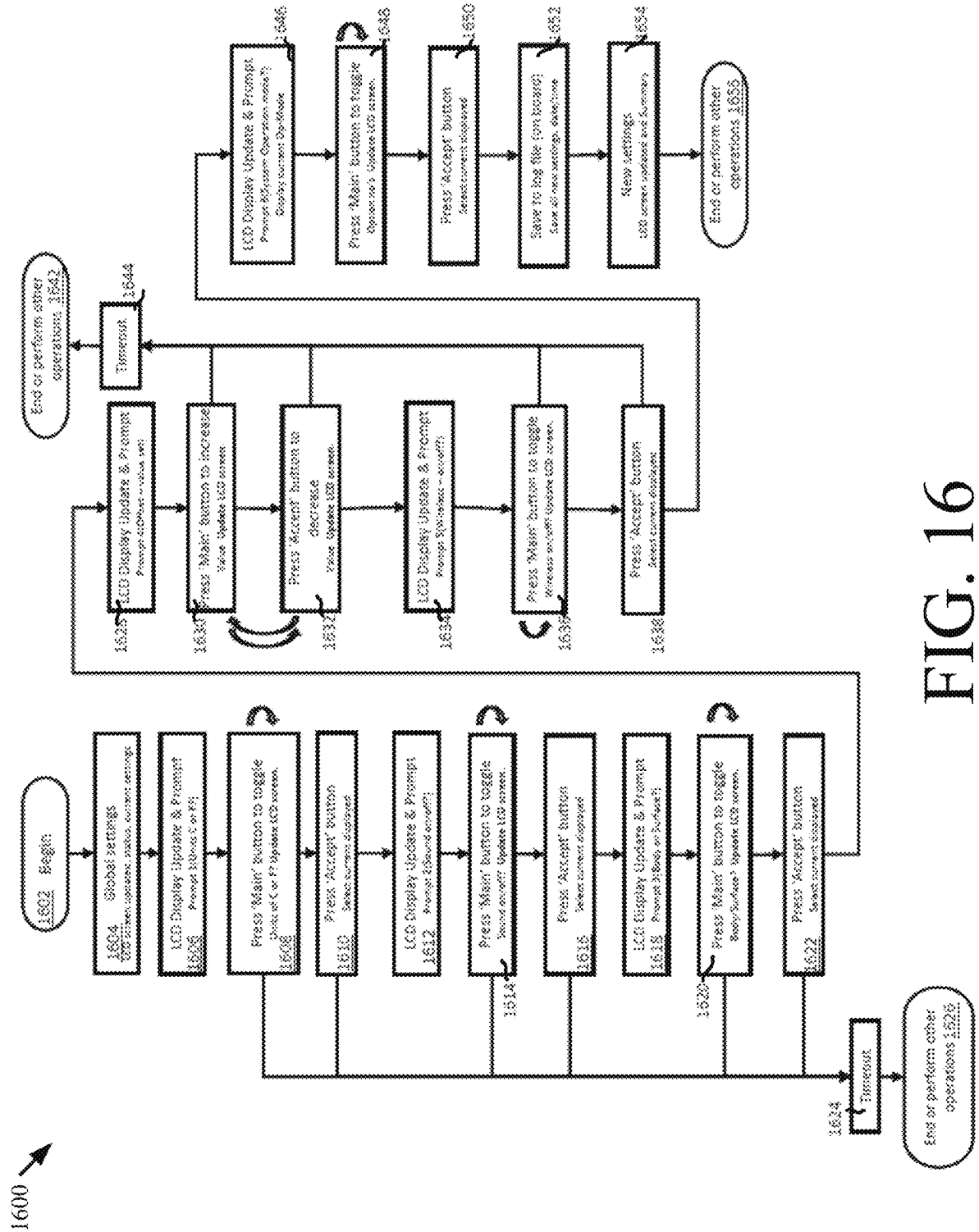
FIG. 16 provides a flow diagram of an illustrative method for setting operations and/or parameters of a thermometer.

Referring now to FIG. 16, there is provided a flow diagram of an illustrative method 1600 for setting operations and/or parameters of a thermometer when in its configuration mode. Method 1600 begins with 1602 and continues with 1604 where a Graphical User Interface (GUI) is presented on a display of the thermometer. The GUI is configured to facilitate user-software interactions for configuring operations of the thermometer. As shown by functional blocks 1606-1610, the GUI comprises prompts and/or widgets to allow a user to optionally select the units for the temperature measurements (e.g., degrees Centigrade or Fahrenheit). In functional blocks 1612-1616, the GUI presents prompts and/or widgets to allow the user to optionally enable and disable sound of the thermometer. The GUI also comprises prompts and/or widgets to allow the user to optionally select a surface temperature measurement mode of operation or a core body temperature computation mode of operation, as shown by functional blocks 1618-1622. The GUI further comprises prompts and/or widgets to allow the user to optionally select an offset mode to add a calibration value to the temperature measurement values for standardization purposes, as shown by functional blocks 1628-1632. In functional blocks 1634-1638, the GUI facilitates user software-interactions for enabling or disabling wireless communication devices/capabilities of the thermometer. The GUI also facilitates user software interactions for selecting an operational mode from a plurality of operational modes pre-defined by the thermometer. Such operational modes can include, but are not limited to, a calibration mode, a configuration mode, a power source charging mode, a thermometer mode without wireless communications, a thermometer with wireless communications, an over-the-air mode, a data logging mode, a thermometer performance logging/analysis mode, and/or a power management mode of operation. In some scenarios, the system performs operations to confirm calibration stability prior to sending any reading from the thermometer. If the calibration stability is not confirmed, then the reading is not sent from the thermometer. In 1652, the thermometer performs reconfiguration operations thereof in accordance with the user selections. Subsequently, method 1600 ends or other operations are performed as shown by functional block 1656. The widgets can include, but are not limited to, virtual buttons, text input boxes, list boxes, and/or menus.

Note that the system comprises a timeout feature that causes the thermometer to perform operations in accordance with default setting(s) or previously selected setting(s) when user software interaction(s) are not received by the thermometer in a given period of time from when the GUI prompts the user for a setting selection. The timeout feature is represented by functional blocks 1624 and 1644. Subsequently, the method 1600 ends or the thermometer performs other operations as shown by functional blocs 1626 and 1642.

Figure 17:
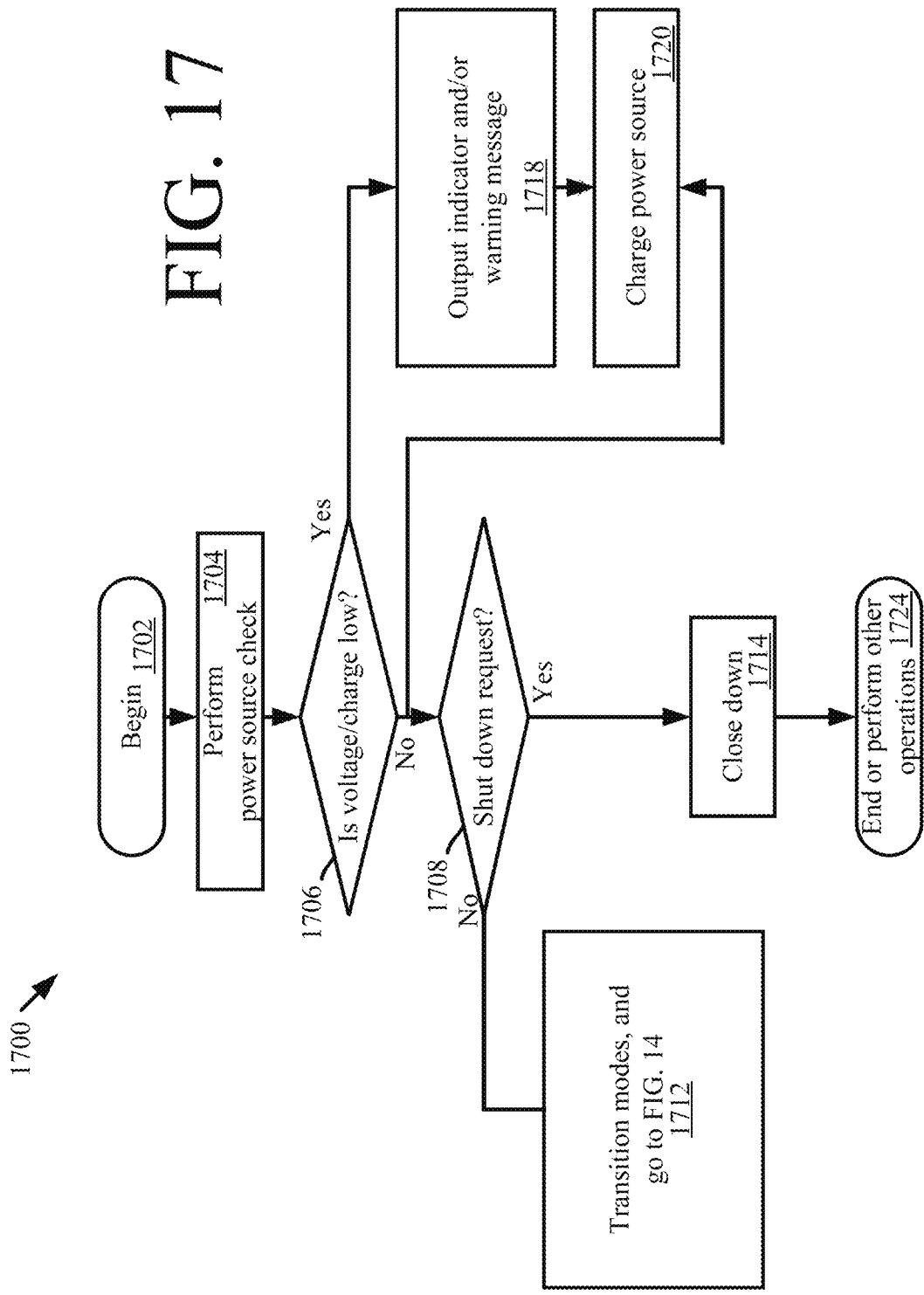
FIG. 17 provides a flow diagram of an illustrative method for performing a battery check and/or other power management operations of a thermometer.

Referring now to FIG. 17, there is provided a flow diagram of an illustrative method 1700 for performing a battery check and/or other power management operations by a thermometer. Method 1700 can begin in response to certain trigger events. The trigger events can include, but are not limited to, the thermometer being turned on, the thermometer is in a shut-down mode, completion of a temperature measurement cycle, a user-software interaction selecting a power management mode of operation, the insertion of the thermometer in a charging dock, and/or a change in a surrounding environment (e.g., an increase or decrease of light, Radio Frequency (RF) energy, and/or other types of energy that can be harvested).

Method 1700 begins with 1702 and continues with 1704 where the thermometer performs operations to determine the current voltage level of a battery and/or the current state of charge of another power source (e.g., a super capacitor). The current voltage level and/or current state of charge is(are) compared to threshold values to determine whether it(they) are relatively low. If not [1706: NO], then method 1700 continues with decision block 1708. In 1708, the thermometer determines whether it is to be turned off or otherwise closed down. If not [1708: NO], then the thermometer transitions to a temperature measurement mode of operations, and goes to FIG. 14 as shown by functional block 1712. If so [1708: YES], then the thermometer performs operations to turn off or otherwise close down in functional block 1714. Subsequently, method 1700 ends in functional block 1724.

If the battery's voltage level and/or the other power source's level of charge is(are) low [1706: YES], then an indicator and/or warning message is output from the thermometer re the low voltage level/charge level. The output can be visual, tactile and/or auditory. In response to the indicator and/or warning message, the thermometer's power source may be charged as shown by functional block 1720. The thermometer can be a low energy device and have power management functions to provide sustainability thereof. The thermometer may also be configured with a counter to detect the number of readings over its lifetime. The power source charging can be achieved by placing the thermometer in a charging station (e.g., charging dock/station 116 of FIG. 1) and/or otherwise coupling the thermometer to an external power source. In some scenarios, the thermometer comprises an energy harvesting circuit that is configured to harvest energy (e.g., light, RF energy, heat, etc.) from a surrounding environment. The energy harvesting circuit can be enabled for charging the battery or other power source(s) of the thermometer. The present solution is not limited to the particulars of this example. Once the power source has been charged, method 1700 returns to 1708.

Figure 18:
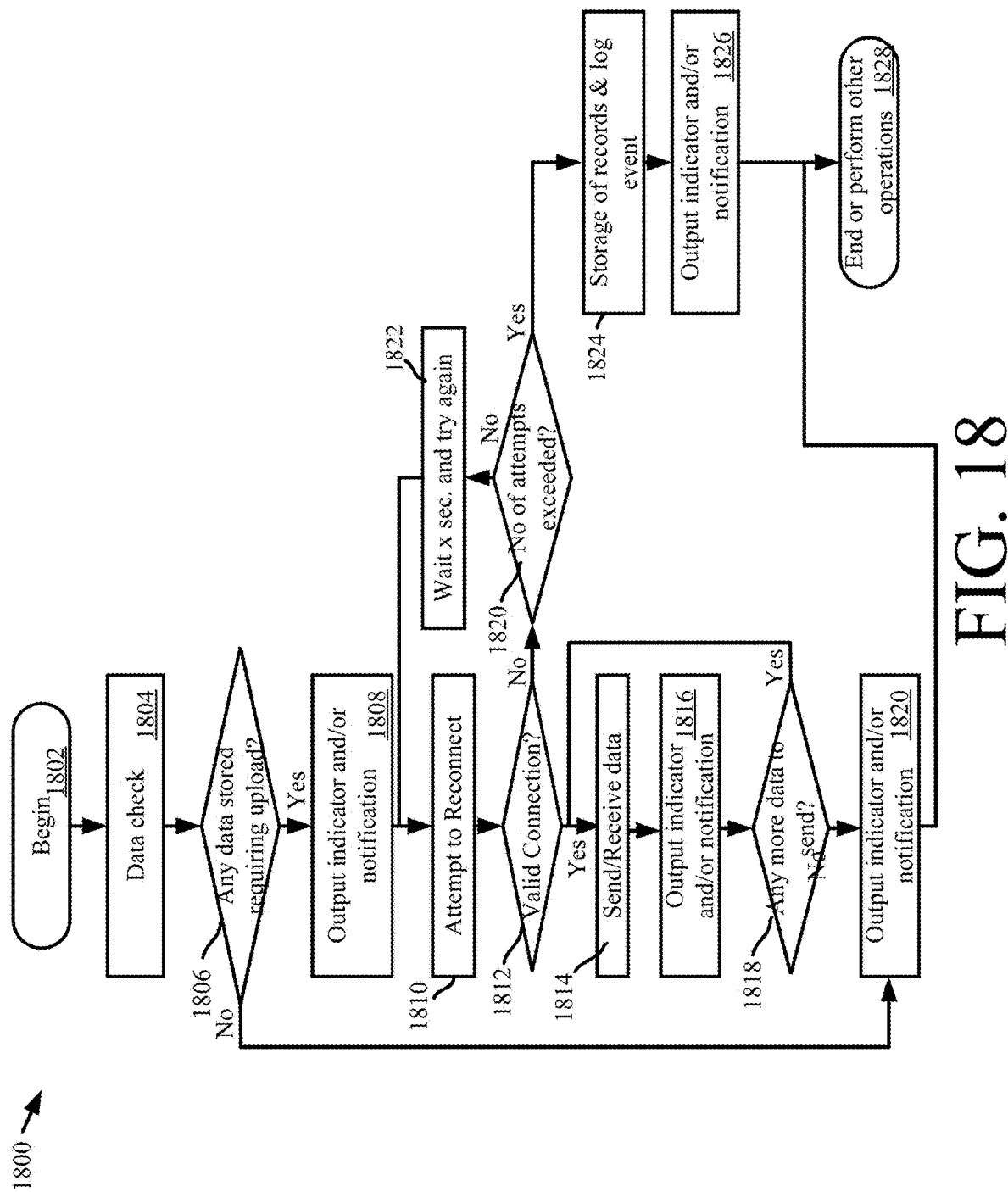
FIG. 18 provides a flow diagram of an illustrative method for performing backup mitigation of thermometer data.

Referring now to FIG. 18, there is provided a flow diagram of an illustrative method 1800 for performing backup mitigation of thermometer data. Method 1800 begins with 1802 and continues with 1804 where the thermometer performs a data check. The data check can involve: accessing a local datastore (e.g., memory 412 of FIG. 4) to identify any data records which are not associated with a log file or other information (e.g., a flag) indicating that the data has been uploaded to a remote datastore (e.g., datastore 112 of FIG. 1). If no data records were identified, then the thermometer makes a determination in 1806 that there is not any data to be uploaded. When this occurs [1806: NO], method 1800 continues with 1820 where a notification or other indicator is output from the thermometer to inform the user that all data uploads have been completed and/or not needed. The notification and/or indication can be tactile, auditory and/or visual.

If one or more data records were identified, then the thermometer makes a determination in 1806 that there is data that needs to be upload. When this determination is made [1806: YES], method 1800 continues with 1808 where an indicator or notification is output from the thermometer to inform the user that data upload was not successful and/or is required. The notification and/or indication can be tactile, auditory and/or visual.

Next in 1810, the thermometer performs operation for establishing a connection with a remote device (e.g., client computing device 106 of FIG. 1, medical clinic computing device 112 of FIG. 1, and/or medical device 122 of FIG. 1). A function may be provided to limit the number of attempts made by the thermometer to establish the connection as shown by functional blocks 1820. If the connection is not made within a given number of attempts [1820: YES], then a log file or record is updated in 1824 to include information about the connection attempt(s). An indicator or warning message may also be output from the thermometer as shown by functional block 1826. Subsequently, method 1800 ends or other operations are performed in functional block 1828.

When the connection is established [1812: YES], the thermometer performs operations to communicate the data to the remote device over a network (e.g., network 104 of FIG. 1). The thermometer may be provided with message(s) from the remote device indicating whether or not the data was received, the data upload is in progress, and/or the data upload was completed successfully. A status indicator can be output from the thermometer to inform the user of the successful transmission of the data and/or the data upload status, as shown by functional block 1816.

Upon completing 1816, the thermometer checks whether there is any more data that needs to be uploaded. If so [1818: YES], method 1800 returns to 1814 where the upload process is repeated for next data. If not [1818: NO], then method 1800 continues with 1820 where an indication is output from the thermometer indicting that all data has been uploaded. Subsequently, method 1800 ends or other operations are performed in functional block 1828.

Figure 19:
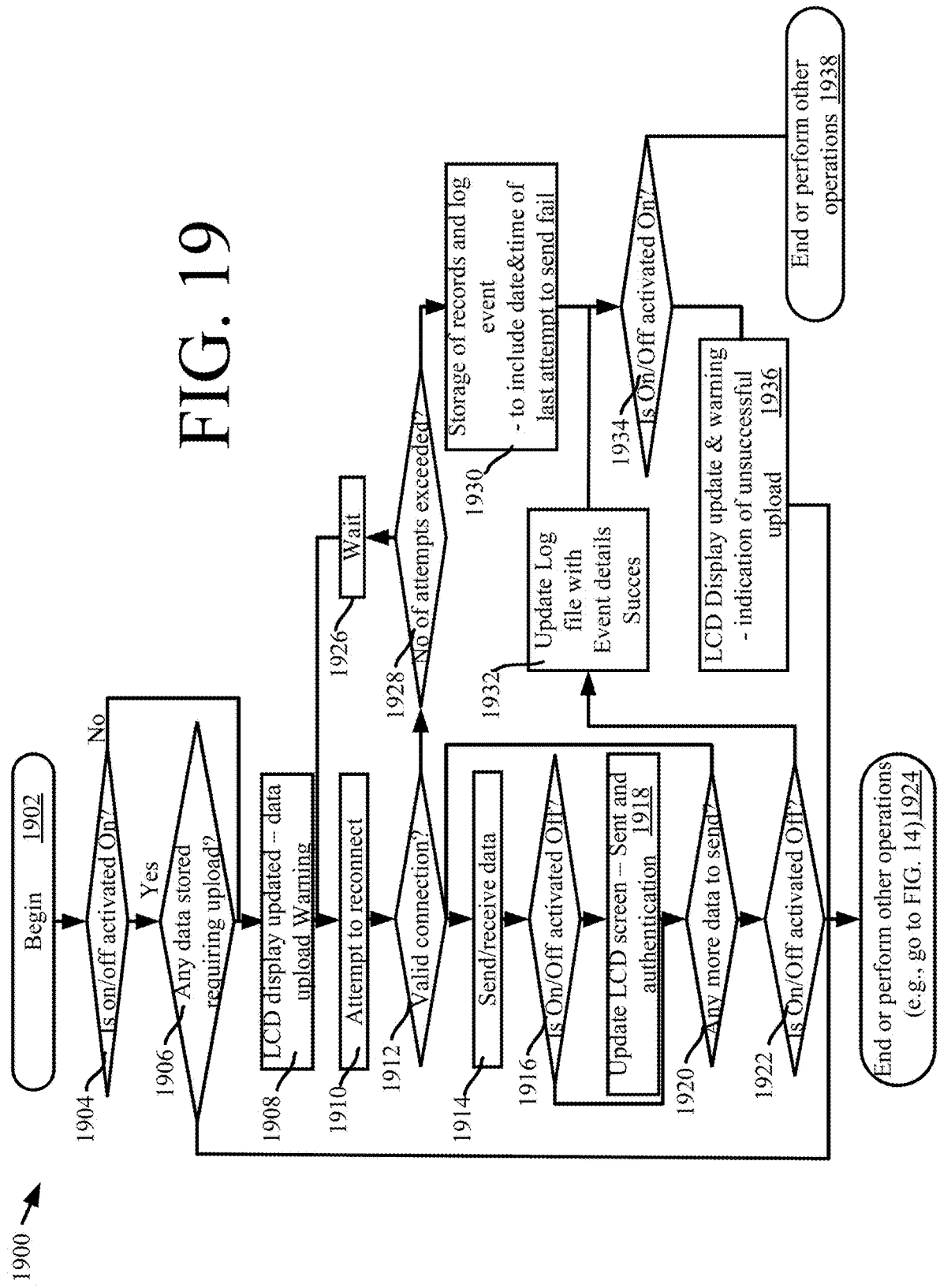
FIG. 19 provides a flow diagram of an illustrative method for an automatic upload of data from a thermometer.

Referring now to FIG. 19, there is provided a flow diagram of an illustrative method 1900 for an automatic upload of data from a thermometer. Method 1900 begins with 1902 and continues with 1904 where the thermometer determines (i) whether or not an automatic upload function is enabled or disabled and/or (ii) whether a wireless communication function is enabled or disabled. If (i) and/or (ii) are enabled [1904: YES], the thermometer performs operations of functional blocks 1906-1938. Note that the operations of functional blocks 1906-1914, 1918, 1920, 1926-1930, 1936 and 1938 are respectively the same as or similar to the operations of functional blocks 1806-1828 of FIG. 18. The difference between method 1900 and method 1800 of FIG. 18 is the addition of decision blocks 1916, 1922 and 1934 to periodically make determinations (i) and/or (ii) during the process.

Figure 20:
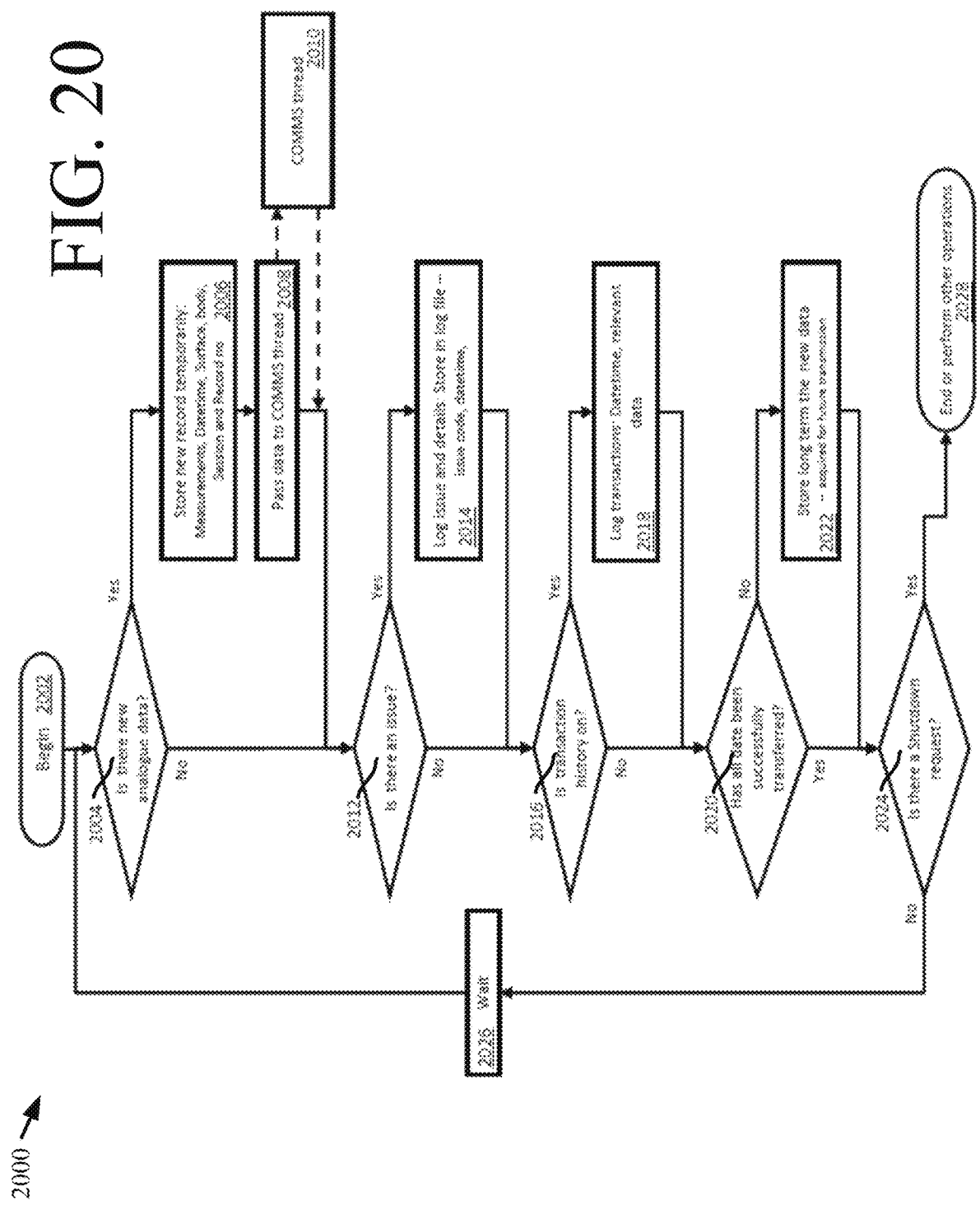
FIG. 20 provides a flow diagram of an illustrative method for data management.

Referring now to FIG. 20, there is provided a flow diagram of an illustrative method 2000 for data management. Method 2000 begins with 2002 and continues with decision block 2004. In block 2004, the thermometer performs operations to determine whether or not there is any new analogue data. If so [2004: YES], then operations are performed in functional blocks 2006-2010 to store the analogue data and/or other information locally on the thermometer and/or remotely in a remote datastore. If not [2004: NO], then the thermometer determines whether there are any system issues and/or faults. The system issues and/or faults are logged in 2014.

When there are not any system issues/faults [2012: NO], the thermometer determines whether a transaction history log function is enabled. If so [2016: YES], then transaction information is logged. Otherwise [216: NO], the thermometer determines whether all data has been successfully transferred to the remote device. If not [2020: NO], then the data will be stored in a local data store for future transmission. Otherwise [2020: YES], the thermometer repeats the process when a shutdown request has not been received [2024: NO]. If a shutdown request has been received, method 2000 ends or other operations are performed to shut down or otherwise turn off the thermometer.

Figure 21:
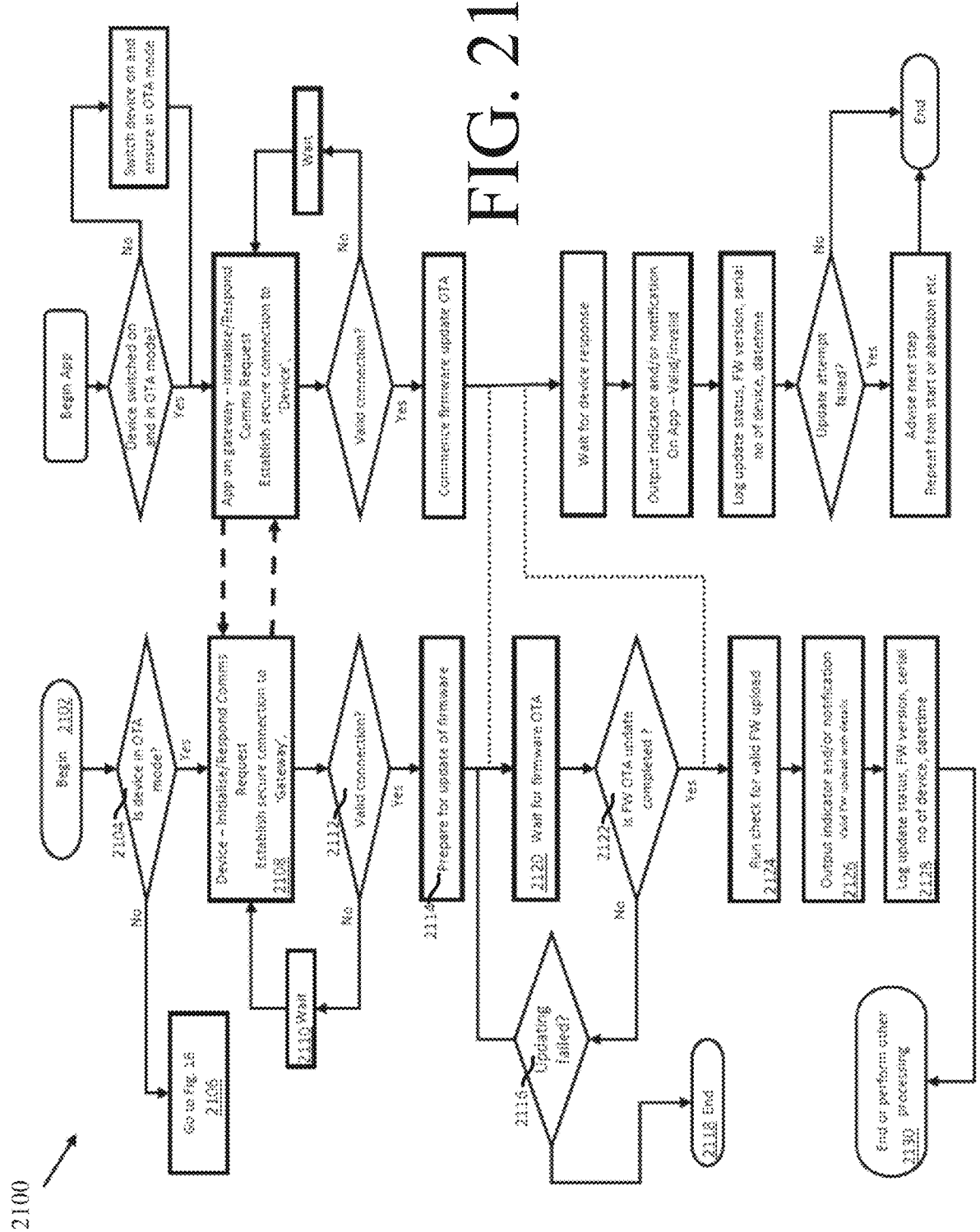
FIG. 21 provides a flow diagram of an illustrative method for thermometer software upgrade.

Referring now to FIG. 21, there is provided a flow diagram of an illustrative method 2100 for thermometer software upgrades. Method 2100 begins with 2102 and continues with 2104 where the thermometer determines whether an over-the-air mode has been enabled. If not [2104: NO], the thermometer transitions to a settings mode of operations and goes to FIG. 16, as shown by functional block 2106.

If so [2104: YES], the thermometer performs operations to establish a wireless connection with a remote device (e.g., client computing device 106 of FIG. 1, server 110 of FIG. 1, medical clinic computing device 114, and/or medical device 122 of FIG. 1) as shown by functional blocks 2108-2112. Once the wireless connection has been established, the thermometer prepares for and receives updated/upgraded software in functional block 2114. When the update/upgrade is completed, the thermometer runs a check to confirm a valid software upload in functional block 2124. An indicator may be output in functional block 2126 from the thermometer to indicate to a user that the software update/upgrade was completed successfully. In functional block 2128, information is logged re the software update/upgrade. Subsequently, method 2100 ends or other operations are performed in functional block 2130.

Figure 22:
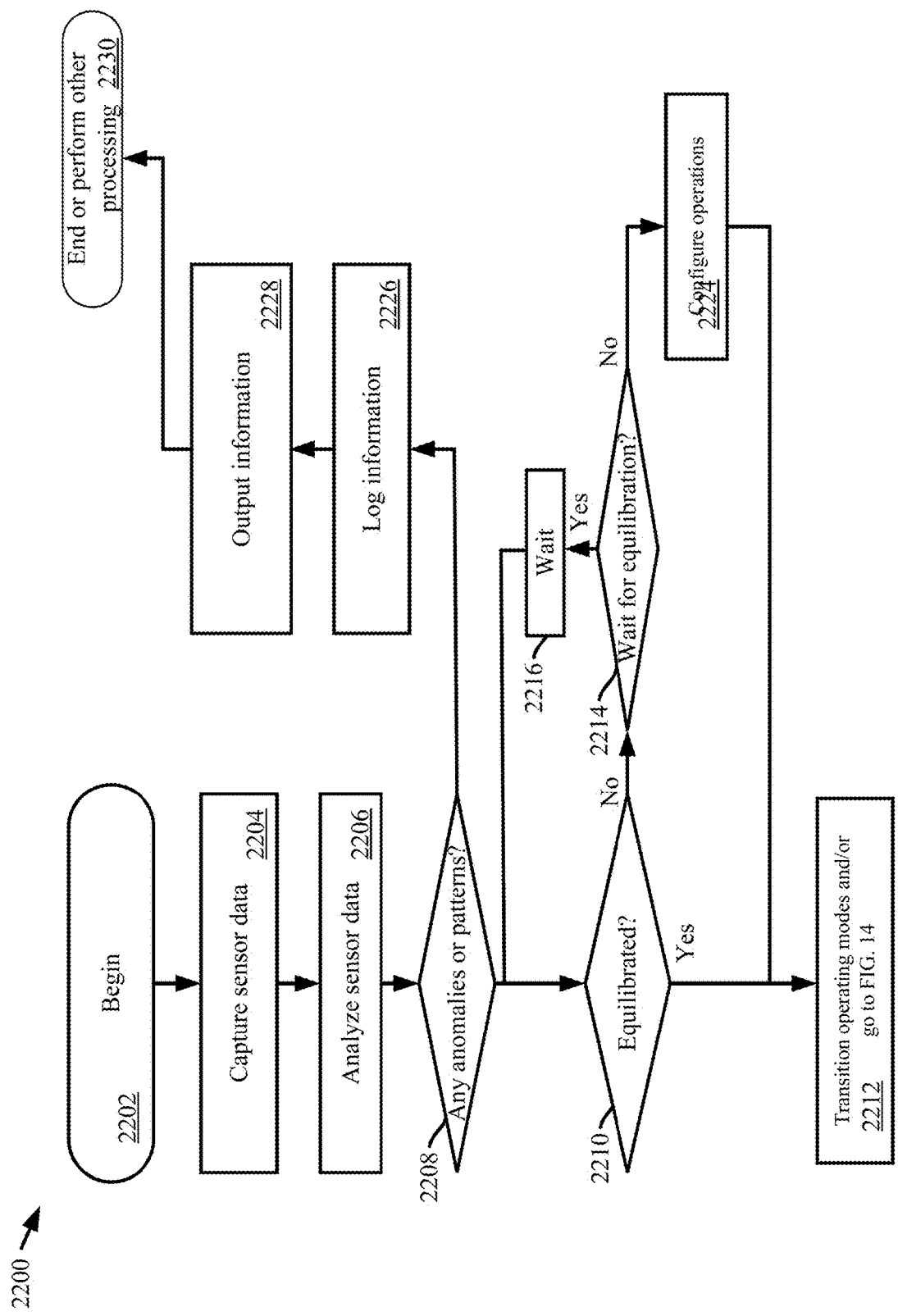
FIGS. 22-24 each provide a flow diagram of an illustrative method for system management using sensor data.

Referring now to FIG. 22, there is provided a flow diagram of an illustrative method 2200 for system management using sensor data. Method 2200 begins at 2202 and continues with 2204 where sensor data is captured or otherwise generated by sensor devices (e.g., sensors 310, 312, 314, 316 and/or 318 of FIG. 3) disposed at various locations on/in the thermometer housing. The sensor devices can include, but are not limited to, humidity sensor(s), temperature sensor(s), accelerometer(s), mechanical shock/vibration sensor(s), a scent/smell sensor, location sensor(s) (e.g., GPS sensor), camera(s), and/or microphone(s). The locations can include, but are not limited to, a location adjacent to an internal processor or computing device (e.g., computing device 306 of FIG. 3), a location on a Printed Circuit Board (PCB), a location embedded in the housing, and/or a location on the housing. For example, in some scenarios, the sensor devices measure a temperature of an electronic component (e.g., a processor) of the thermometer, a temperature of a PCB of the thermometer, a temperature at a reference location inside the thermometer, a temperature of an environment external to the thermometer, a humidity inside the thermometer housing, a humidity of an external environment, any shock and/or vibration experienced by the thermometer, any acceleration and/or other movement experienced by the thermometer, sounds internal to the thermometer, sounds external to the thermometer, any scents/smells inside of and/or outside of the thermometer, locations of the thermometer, and/or objects in proximity to the thermometer. The present solution is not limited to the particulars of this example. The sensor measurements/detections can be performed continuously or periodically in accordance with any given application.

In functional block 2206, the sensor data is analyzed to detect anomalies and/or patterns therein. Information for any detected anomalies/patterns can be logged as shown by functional block 2226. An indicator or other notification can be output from the thermometer in functional block 2228 to inform/notify the user of such detection. Subsequently, method 2200 ends or other operations are performed in functional block 2230.

In this regard, the thermometer can be configured to provide a patient monitoring solution in addition to a temperature measurement solution. For example, temperature measured values output from the reference sensor 326 are monitored to detect when the reference temperature falls outside of a specified range. When such detection is made, the thermometer may generate and output an indicator and/or a recommendation to attend to the individual's medical condition in a given manner (e.g., provide more or different medications, dispatch a nurse to the patient, administer fluids or solid food to the patient, etc.).

The thermometer can also be configured to facilitate a centralized asset management solution in addition to a temperature measurement solution. For example, a remote centralized computing device can communicate with a plurality of thermometers to obtain sensor data therefrom. The remote centralized computing device can analyze the obtained sensor data to determine whether any of the thermometers needs to be serviced, replaced, re-charged and/or re-calibrated. The remote centralized computing device may then output a message indicating the health of each thermometer, any operational issues with the thermometers, and/or recommendations for servicing/replacing/charging/calibrating the thermometer(s). The message could also cause a person to be dispatched to the location(s) of the thermometer(s) and/or bring the thermometer(s) to a given location.

The anomaly/pattern detection can be achieved by comparing measurement values to pre-defined threshold values stored in a local data store (e.g., memory 412 of FIG. 4) of the thermometer and/or by performing a machine learning algorithm to detect objects and/or learned patterns of sensor data. Any machine learning algorithm can be used here. For example, one or more of the following machine learning algorithms is employed here: supervised learning; unsupervised learning; semi-supervised learning; and reinforcement learning. The machine learning algorithm can be trained to make predications of thermometer measurement inaccuracies/discrepancies/issues, system faults and/or malfunctions based on learned combinations of temperature measurement values, humidity measurement values, device vibrations, applied external forces (e.g., external forces from the thermometer being dropped on the ground that cause acceleration, movement, mechanical shock, vibration, and/or deformation of at least part of the thermometer), internal/external sounds of given types (e.g., cracking sound, popping sound, explosion sound, impact sound, etc.), internal/external smells (e.g., smoke, etc.), proximity of objects of given types, device deformation, device movement(s), and/or device location(s).

In some scenarios, the sensor data can be analyzed to determine whether or not the thermometer is equilibrated by comparing a plurality of temperature measurement values to each other (e.g., a temperature of the electronic components internal to the housing is the same as or similar to a temperature of an external environment), as shown by functional block 2210. If the thermometer is equilibrated [2210: YES], then method 2200 continues with 2212 where the thermometer transitions operating modes (e.g., enters a temperature measurement mode) and goes to FIG. 14.

If the thermometer is not equilibrated [2210: NO], then the system may wait a given amount of time and perform another iteration of sensor data analysis to re-check for equilibration as shown by functional blocks 2214-2216. If the thermometer can proceed without equilibration [2214: NO], then operations of functional block 2224 are performed to configure operations of the thermometer according to a given rule and/or sensor data profile (e.g., according to a thermal gradient across the device). For example, the thermometer may be caused to add or subtract a given offset amount $V_{offset}$ to/from any temperature measurements for target individuals. The given offset amount $V_{offset}$ can be pre-defined and stored in a local datastore (e.g., memory 412 of FIG. 4 or remote datastore (e.g., datastore 112 of FIG. 1), or alternatively dynamically determined in accordance with a given algorithm. This algorithm may be defined by the following mathematical equation (1) in which sensor data values $S_1, S_2, \ldots, S_N$ are weighted and combined.

$$V_{offset} = W_1 \cdot S_1 + W_2 \cdot S_2 + \ldots + W_N \cdot S_N \tag{1}$$

where $W_1, \ldots, W_N$ each represent a weight for a given measurement value. Some or all of the sensor data values $S_1, S_2, \ldots, S_N$ can be of the same type (e.g., all temperature values, but measured at different locations on/in the thermometer) or of different types (e.g., temperature and/or humidity values measured at one or more locations on/in the thermometer). The sensor data value(s) can include, but are not limited to, actual measured values (e.g., temperature measurements), and/or values determined based on sensor data (e.g., values assigned to geographical locations and/or values assigned to objects and/or smells of given types). Next, the thermometer transitions operating modes (e.g., enters a temperature measurement mode) and goes to FIG. 14, as shown by functional block 2212.

Figure 23:
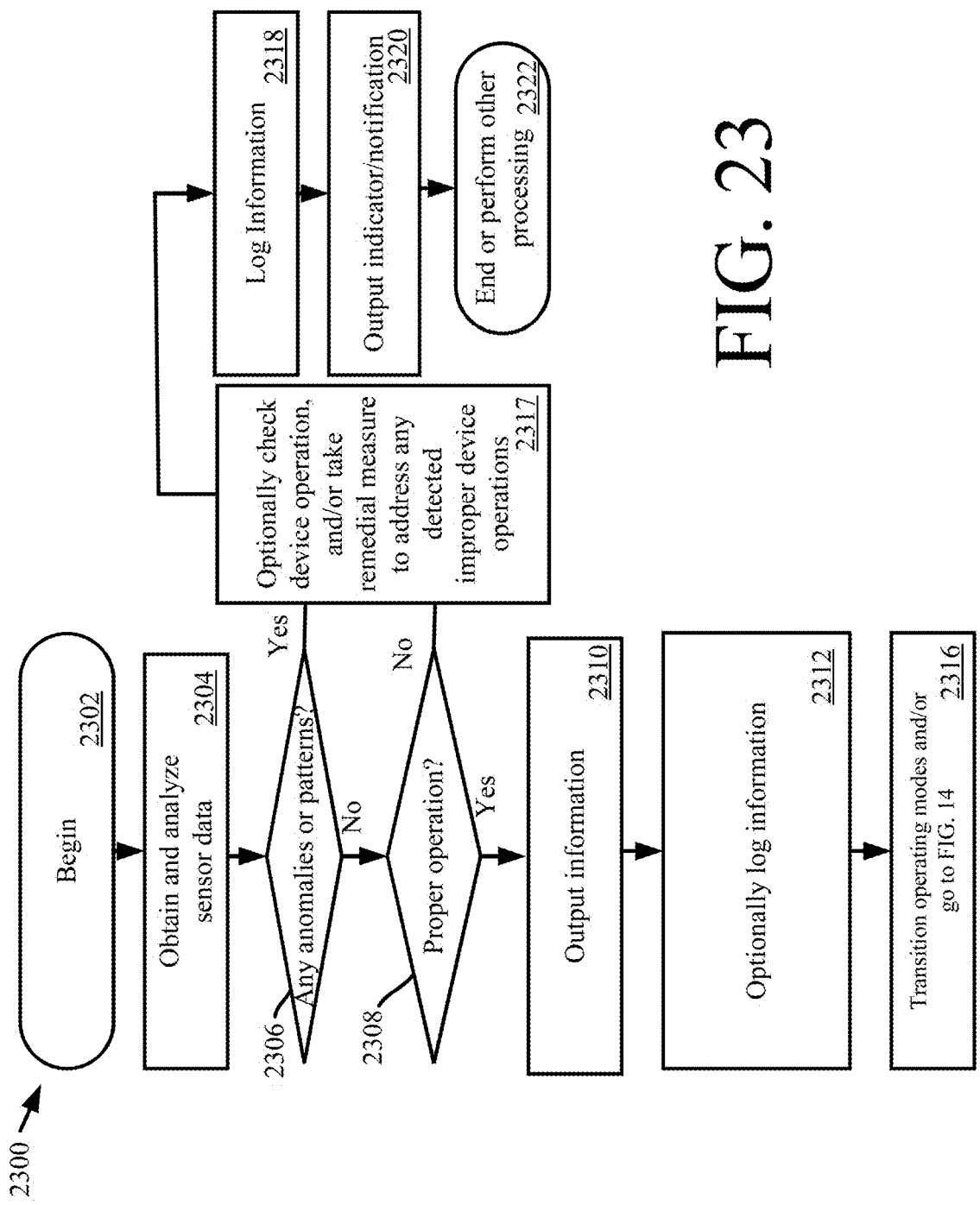

Referring now to FIG. 23, there is provided a flow diagram of an illustrative method 2300 for system management. Method 2300 begins at 2302 and continues to 2304 where sensor data is obtained and analyzed to detect any anomalies and/or patterns therein. This detection can be achieved in a manner similar to that described above in relation to functional blocks 2204-2206 of FIG. 22. If there are anomalies and/or patterns [2306: YES], then the system can optionally perform operations in functional block 2317 to check whether the thermometer is operating properly, and/or to take remedial measure(s) to address any detected improper device operations (e.g., switch operations from a first device to a second back-up device, and/or switch operating modes for optimizing operations of the thermometer in view of the detected anomalies, sensor data patterns and/or improper electronic component operation/functioning). Information regarding the anomalies, patterns, device operations and/or remedial measures can be logged in functional block 2318. An indicator and/or notification can be output from the thermometer to inform a user of the detected anomalies and/or patterns, as shown by functional block 2320. Subsequently, method 2300 ends or other operations are performed in functional block 2322.

If there are not any anomalies and/or patterns detected [2306: NO], the thermometer performs operations to determine whether one or more electronic components thereof are operating as expected. If one or more electronic components is not operating as expected [2308: NO], then remedial measure(s) can be taken in functional block 2317. Information can be logged in 2318, and an indicator/notification can be output from the thermometer in 2320. Subsequently, method 2300 ends or other operations are performed in functional block 2322.

If the electronic components are operating as expected [2308: YES], then information can be output from the thermometer indicating such proper operation and/or that the thermometer is ready for generating temperature measurements. Information may also be logged as shown by functional block 2312. Subsequently, the thermometer may transition modes, for example, to a temperature measurement mode and go to FIG. 14, as shown by functional block 2316.

Figure 24:
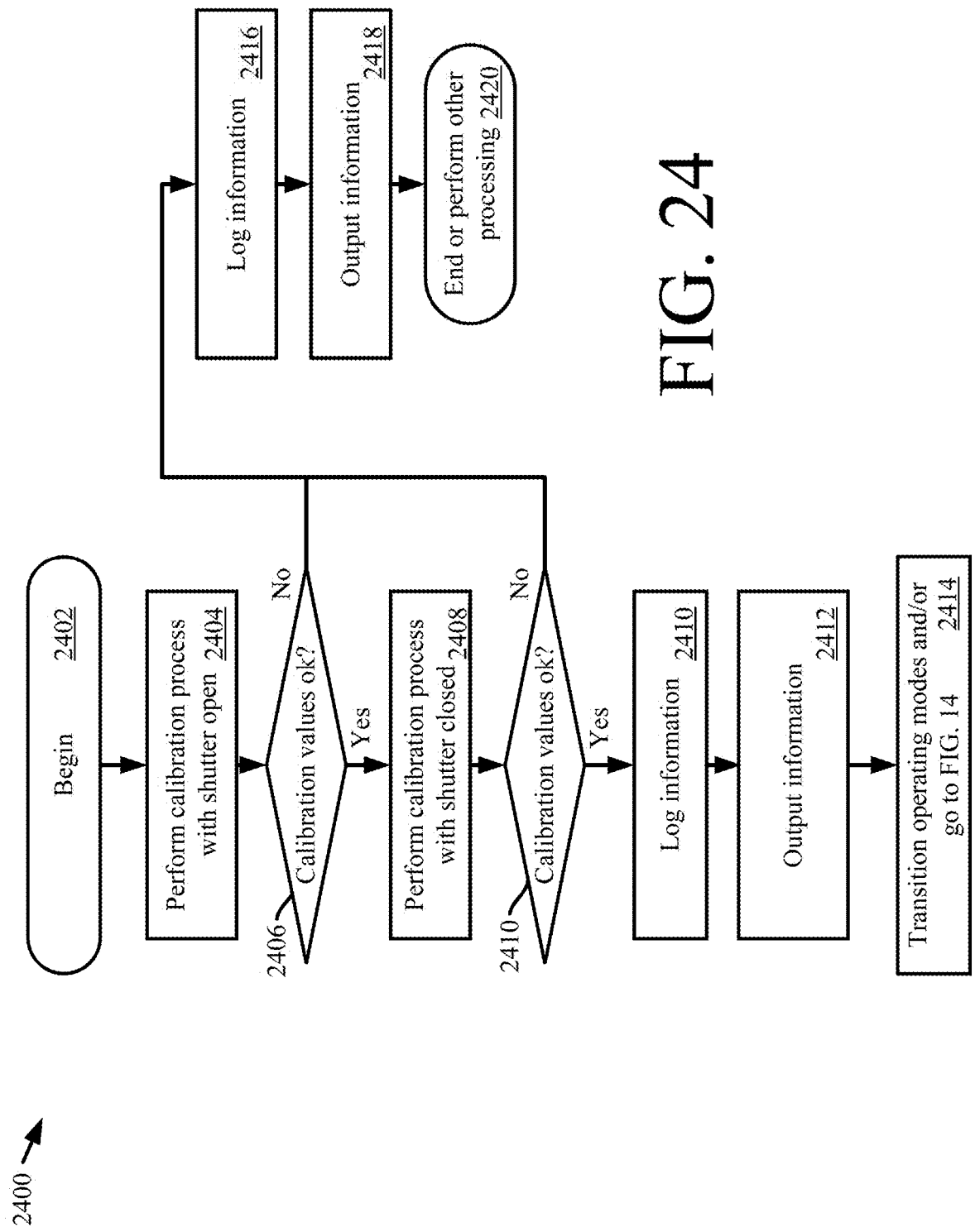

Referring now to FIG. 24, there is provided a flow diagram of an illustrative method 2400 for system management. Method 2400 begins with 2402 and continues with 2404 where a calibration routine is performed with shutter 332 of FIG. 3 in an open position. For example, a reference temperature sensor is used to obtain a temperature measurement of an environment internal to and/or external to the thermometer. The temperature measurement value is compared to previous temperature measurement values. If the temperature measurement value does not match (by a certain degree) to the previous value(s), then the temperature sensor is deemed to be properly calibration in 2406. Otherwise, the temperature sensor is deemed to be improperly calibrated. Information regarding the first calibration routine can be logged in functional block 2416 and/or output from the thermometer in functional block 2418. Subsequently, method 2400 ends or other operations are performed in functional block 2420.

In functional block 2408, the calibration routine can be performed once again with shutter 332 of FIG. 3 in a closed position. Information regarding the calibration routines can be logged and/or output from the thermometer as shown by functional blocks 2410-2412 and 2416-1418. In the scenarios that results of the calibration process indicate the thermometer and/or electronic device(s) thereof is(are) operating properly, the thermometer can transition operational mode, for example, to a temperature measurement mode and go to FIG. 14, as shown by functional block 2414.

In some scenarios, the thermometer is configured to automatically measure an individual's temperature at given times and/or analyze a set of temperature measurements for the individual (obtained over a window of time) to determine a personalized/customized baseline value, threshold temperature value, or range of temperature values for the individual. For example, the thermometer can select a threshold value(s) from a plurality of threshold value(s) based on an average temperature of the individual over a given period of time, a maximum or minimum difference between measured temperature values in the set, a detected trend in an increase and/or decrease of measured temperature values. The base line value and/or threshold value could be selected or computed based on average of temperature measured values and/or a weighted combination of temperature measured values. For example, each temperature measured value has a weight selectively/dynamically assigned thereto based on other sensor data (such as humidity, reference temperature, inter/external environment temperature, shock, vibration, smell, range of the individual) generated at the same/similar time as a respective temperature measured value). The base line and/or threshold value can alternatively or additionally be selected in accordance with the medical condition of the individual.

Figure 25A:
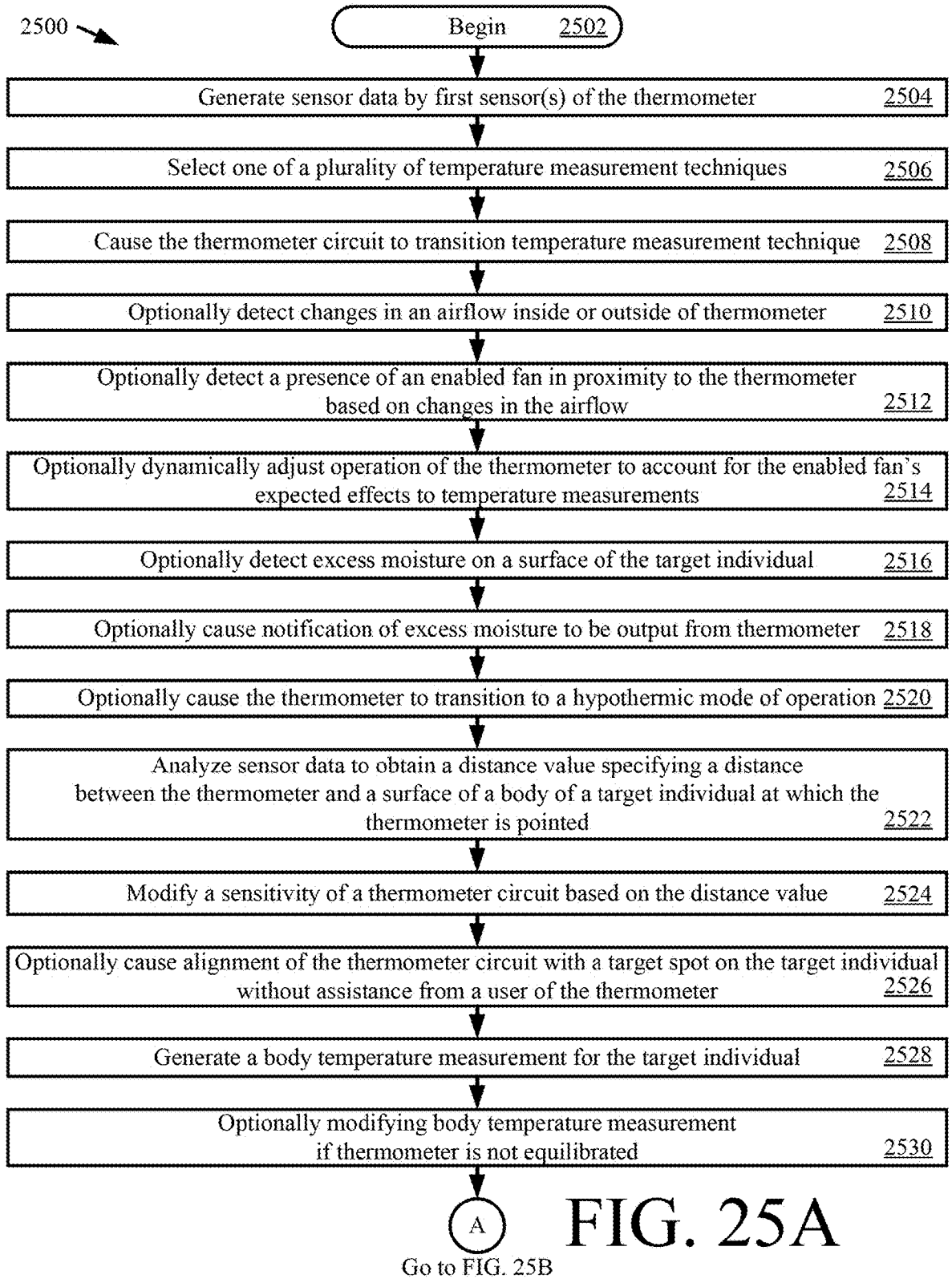
FIGS. 25A-25B (collectively referred to as "FIG. 25) provide a flow diagram of an illustrative method for operating a thermometer.

Referring now to FIG. 25, there is provided a flow diagram of an illustrative method 2500 for operating a thermometer (e.g., thermometer 102, 120 of FIG. 1, 202-218 of FIG. 2, and/or 300 of FIG. 3). The present solution is not limited to the particular order in which operations are performed in FIG. 25. Two or more operations can be performed in a different relative order than that shown in FIG. 25.

Method 2500 begins with 2502 and continues with 2504 where sensor data is generated by sensor(s) (e.g., 308-318, 322, 326, and/or 328 of FIG. 3) of the thermometer. In 2506, a temperature measurement technique is selected by a processor (e.g., CPU 406 of FIG. 4) or computing device (e.g., computing device 306 of FIG. 3) of the thermometer that is to be used by a thermometer circuit (e.g., thermometer circuit 324 of FIG. 3) to generate the body temperature measurement for a target individual (e.g., individual 124 of FIG. 1). The temperature measurement techniques can include, but are not limited to, a shutter-based technique, a multi-temperature sensor-based technique and/or an interchangeable filter-based technique. This selection can be made based on user input, sensor data, a distance value, a condition of an environment internal to the thermometer, a condition of an environment external to the thermometer, a body part of the target individual that is closest to the thermometer, and/or a medical condition of the target individual. The thermometer is then caused in 2508 to transition to the selected temperature measurement technique. This transition can be performed in response to a trigger event. The trigger event can include, but is not limited to, a user-software interaction, actuation of an input device, movement of the thermometer into a specific geographic location, a temperature measurement exceeding a threshold value, or a change in sensitivity of the temperature sensor.

In 2510, the processor or computing device detects an airflow inside and/or outside of the thermometer. The sensor data generated in 2504 can be used to make this detection. Characteristic(s) of the detected airflow is(are) then used in 2512 to detect a presence of an enabled fan located in proximity to the thermometer. The characteristics can include, but are not limited to, velocity, airflow rate, changes in velocity, and/or changes in airflow rate. Operation of the thermometer may be adjusted in 2512 to account for the enabled fan's expected effects to temperature measurements.

In 2516, the processor or computing device detect excess moisture on a surface of the target individual. The sensor data generated in 2504 can be used to make this detection. The processor or computing device can then optionally cause a notification to be output from the thermometer indicating that excess moisture has been detected, as shown by 2518. In 2520, the processor or computing device may cause the thermometer to enter a hypothermic/hyperthermic mode of operation. In the hypothermic/hyperthermic modes of operation, the thermometer is able to generate accurate body temperature measurements in a temperature range of 30° C. to 34° C. or 40° C. to 42° C.

Sensor may be analyzed by the processor or computing device in 2522 to obtain a distance value. The distance value specifies a distance between the thermometer and a surface of a body of a target individual at which the thermometer is pointed. A sensitivity of the thermometer circuit may be modified in 2524 based on the distance value. The processor or computing device may cause alignment of the thermometer circuit with a target spot on the target individual without assistance from a user of the thermometer, as shown by 2526.

In 2528, the thermometer generates a body temperature measurement for the target individual. A surface of thermometer may be at least partially formed of an anti-microbial material to minimize spread of an infection. The body temperature measurement may be generated by the thermometer circuit using signals output from a plurality of interchangeable bandpass filters. The body temperature measurement may be optionally modified in 2530 if the thermometer is not equilibrated. Upon completing 2528 or 2530, method 2500 continues with 2532 of FIG. 25B.

Figure 25B:
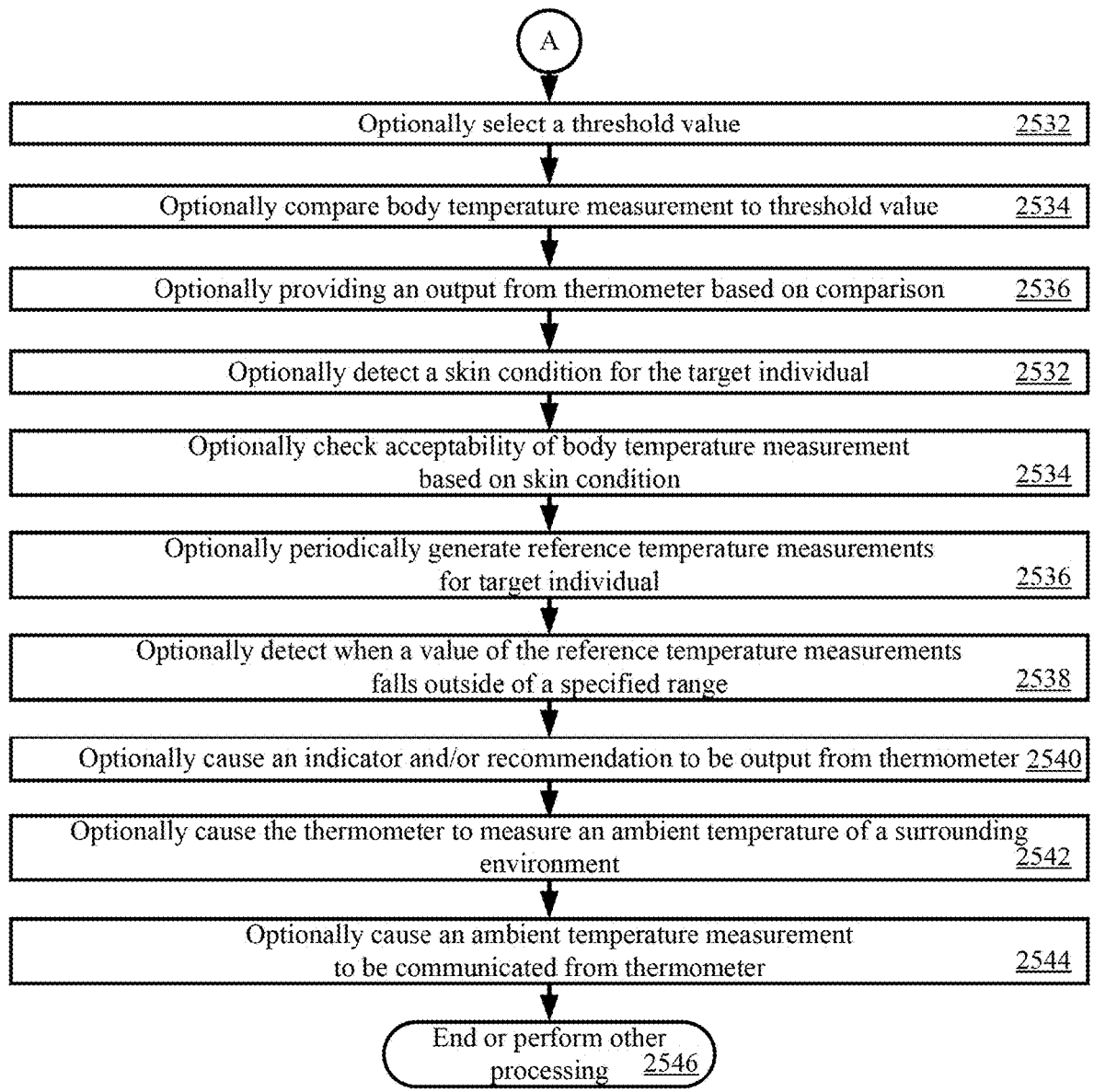

As shown in FIG. 25B, 2532 involves performing operations by the processor or computing device to select a threshold value. The threshold value may be selected from a plurality of threshold values based on an average temperature of the target individual over a given period of time, a difference between measured temperature values in a given set, a trend in the measured temperature value, and/or a weighted combination of the measured temperature values. The body temperature measurement is optionally compared to the threshold value in 2534. An output may be provided from the thermometer in 2536 based on comparison results.

In optional 2532, the processor and/or computing device detects a skin condition for the target individual based on sensor data. The detected skin condition may be used in 2534 to check an acceptability of the body temperature measurement. The body temperature measurement may be discarded if found to be unacceptable or output from the thermometer if found to be acceptable.

In 2536, the thermometer optionally periodically and automatically generates reference temperature measurements for the target individual. The processor and/or computing device can detect when a value of the reference temperature measurements falls outside of a specified range, as shown in 2538. Information may be output from the thermometer in 2540. The information may include an indicator which indicates the value of the reference temperature measurements fall outside of the specified range. The information can alternatively or additionally include a recommendation for attending to a medical condition of the target individual.

In 2544, the thermometer is optionally caused to measure an ambient temperature of a surrounding environment. The ambient temperature measurement may be communicated from the thermometer to an external device (e.g., a heating, ventilation and air conditioning system) in 2544. Subsequently, method 2500 ends or other operations are performed (e.g., return to 2502).

Figure 26:
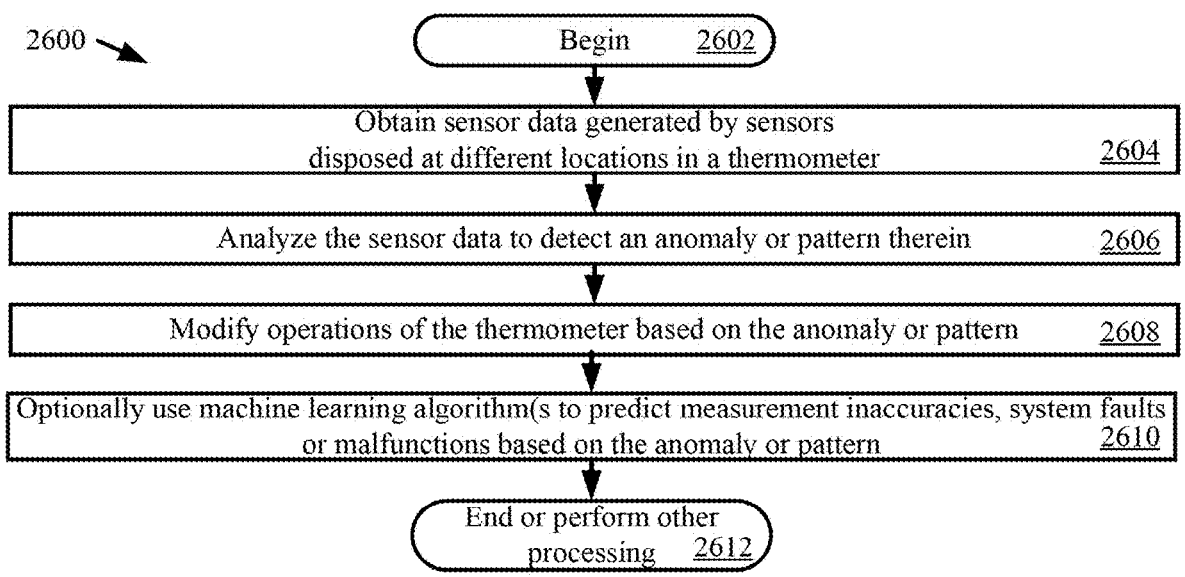
FIG. 26 provides a flow diagram of another illustrative method for operating a thermometer.

Referring now to FIG. 26, there is provided a flow diagram of an illustrative method 2600 for operating a thermometer (e.g., thermometer 102, 120 of FIG. 1, 202-218 of FIG. 2, and/or 300 of FIG. 3). The present solution is not limited to the particular order in which operations are performed in FIG. 26. Two or more operations can be performed in a different relative order than that shown in FIG. 26.

Method 2600 begins with 2602 and continues with 2604 where a processor (e.g., CPU 406 of FIG. 4) or computing device (e.g., computing device 306 of FIG. 3) obtains sensor data generated by sensor(s) (e.g., sensor(s) 312, 326 and/or 328 of FIG. 3) disposed at different locations in the thermometer. The sensors can include, but are not limited to, humidity sensor(s), temperature sensor(s), accelerometer(s), mechanical shock/vibration sensor(s), scent/smell sensor(s), location sensor(s), camera(s), and/or microphone(s). The different locations can include, but are not limited to, a location adjacent to an internal processor or computing device of the thermometer, a location on a printed circuit board of the thermometer, a location embedded in a housing of the thermometer, and/or a location on the housing. The sensor data can include, but is not limited to, a temperature of an electronic component of the thermometer, a temperature of a printed circuit board of the thermometer, a temperature at a reference location inside the thermometer, a temperature of an environment external to the thermometer, a humidity inside the thermometer housing, a humidity of an external environment, any shock and/or vibration experienced by the thermometer, any acceleration and/or other movement experienced by the thermometer, sounds internal to the thermometer, sounds external to the thermometer, any scents/smells inside of and/or outside of the thermometer, locations of the thermometer, and/or objects in proximity to the thermometer.

The sensor data is analyzed in 2606 to detect an anomaly or pattern therein. The anomaly or pattern may be detected using a machine learning algorithm. The anomaly or pattern may indicate whether the thermometer is equilibrated. Operation of the thermometer may be modified in 2608 based on the anomaly or pattern. This modification can include, but is not limited to, transitioning operational modes of the thermometer, and/or adjusting a temperature measurement value in accordance with an offset value selected or determined based on the detected anomaly or pattern.

The machine learning algorithm may be used in 2610 to predict measurement inaccuracies, system faults or malfunctions based on the detected anomaly or pattern. The machine learning algorithm may be trained to detect combinations of at least two of a temperature measurement value, a humidity measurement value, a device vibration, an applied external force, a sound of a given type, a smell, a proximity of an object of a given type, a device deformation, a device movement, and a device location. Subsequently, 2612 is performed where method 2600 ends or other operations are performed (e.g., return to 2602).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a thermometer, comprising:
   generating range data by at least one first sensor of the thermometer;
   analyzing, by a processor of the thermometer, the range data to obtain a distance value representing a distance between the thermometer and a surface of a body of a target individual at which the thermometer is pointed;
   modifying, by the processor, a sensitivity of a thermometer circuit based on the distance value by adjusting an overall size of an aperture of the thermometer circuit;
   obtaining, by the thermometer circuit, temperature data of the surface of the body of the target individual at which the thermometer is pointed;
   generating, by the thermometer circuit, a body temperature measurement for the target individual; and
   performing operations by the processor to cause alignment of the thermometer circuit with a target spot on the target individual by changing a position of at least a portion of the thermometer circuit without assistance from a user of the thermometer.

2. The method according to claim 1, further comprising causing, by the processor, the thermometer to measure an ambient temperature of a surrounding environment.

3. The method according to claim 2, further comprising causing, by the processor, an ambient temperature measurement to be communicated from the thermometer to cause an adjustment to operations of a heating, ventilation and air conditioning system for heating or cooling an environment surrounding the thermometer.

4. The method according to claim 1, further comprising causing the thermometer to transition to a hypothermic or hyperthermic mode of operation in which body temperature measurements are able to be generated in a temperature range of 30° C. to 34° C. or 40° C. to 42° C.

5. The method according to claim 1, further comprising preventing a spread of infection using a surface of thermometer at least partially formed of an anti-microbial material.

6. The method according to claim 1, further comprising detecting, by an airflow sensor controlled by the processor, a change in a velocity or an airflow rate of an airflow inside the thermometer or outside of the thermometer.

7. The method according to claim 6, further comprising detecting, by the airflow sensor or another sensor controlled by the processor, a presence of an enabled fan based on the detected change in the velocity or airflow rate of the airflow which was detected.

8. The method according to claim 7, further comprising dynamically adjusting a temperature measurement operation of the thermometer to account for the enabled fan's expected effects to temperature measurements.

9. The method according to claim 1, further comprising detecting, by the processor, moisture on a surface of the target individual.

10. The method according to claim 9, further comprising causing, by the processor, a notification of the excess moisture to be output from the thermometer.

11. The method according to claim 1, further comprising selecting, by the processor, one of a plurality of temperature measurement techniques that is to be used by the thermometer circuit to generate the body temperature measurement for the target individual.

12. A method for operating a thermometer, comprising:
    generating range data by at least one first sensor of the thermometer;
    analyzing, by a processor of the thermometer, the range data to obtain a distance value representing a distance between the thermometer and a surface of a body of a target individual at which the thermometer is pointed;
    modifying, by the processor, a sensitivity of a thermometer circuit based on the distance value by adjusting an overall size of an aperture of the thermometer circuit;
    obtaining, by the thermometer circuit, temperature data of the surface of the body of the target individual at which the thermometer is pointed; and
    generating, by the thermometer circuit, a body temperature measurement for the target individual;
    selecting, by the processor, one of a plurality of temperature measurement techniques that is to be used by the thermometer circuit to generate the body temperature measurement for the target individual;
    wherein the plurality of temperature measurement techniques comprises a shutter-based technique, a multi-temperature sensor-based technique and an interchangeable filter-based technique.

13. The method according to claim 11, further comprising causing, by the processor, the thermometer circuit to transition between first and second ones of the plurality of temperature measurement techniques based on at least one of the distance value, a condition of an environment internal to the thermometer, a condition of an environment external to the thermometer, and a medical condition of the target individual.

14. The method according to claim 11, further comprising causing, by the processor, the thermometer circuit to transition between first and second ones of the plurality of temperature measurement techniques in response to a trigger event.

15. The method according to claim 14, wherein the trigger event comprises movement of the thermometer into a specific geographic location, a temperature measurement exceeding a threshold value, or a change in sensitivity of the temperature sensor.

16. The method according to claim 1, wherein the body temperature measurement is generated by the thermometer circuit using signals output from a plurality of interchangeable bandpass filters.

17. The method according to claim 1, further comprising detecting a skin condition for the target individual based on second sensor data and using the detected skin condition to check an acceptability of the body temperature measurement.

18. The method according to claim 1, further comprising periodically and automatically generating reference temperature measurements for the target individual and detecting when a value of the reference temperature measurements falls outside of a specified range.

19. The method according to claim 18, further comprising causing an indicator to be output from the thermometer which indicates a detection has been made that the value of the reference temperature measurements falls outside of the specified range.

20. The method according to claim 18, further comprising causing a recommendation for attending to a medical condition of the target individual to be output from the thermometer when a detection is made that the value of the reference temperature measurements falls outside of the specified range.

21. The method according to claim 1, further comprising modifying the body temperature measurement generated for the target individual when second sensor data indicates that the thermometer is not equilibrated.

22. The method according to claim 1, further comprising selecting a threshold value from a plurality of threshold values based on at least one of a difference between measured temperature values in a given set, a trend in the measured temperature value, and a weighted combination of the measured temperature values.

23. The method according to claim 22, further comprising providing an output from the thermometer based on results from comparing the body temperature measurement generated for the target individual to the threshold value which was selected.

24. A non-transitory computer-readable medium that stores instructions that are configured to, when executed by at least one computing device, cause the at least one computing device to perform operations comprising:
   causing range data to be generated by at least one first sensor of a thermometer;
   analyzing the range data to obtain a distance value representing a distance between the thermometer and a surface of a body of a target individual at which the thermometer is pointed;
   modifying a sensitivity of a thermometer circuit by adjusting an overall size of an aperture of the thermometer circuit based on the distance value;
   causing generation of a body temperature measurement for the target individual; and
   performing operations to cause alignment of the thermometer circuit with a target spot on the target individual by changing a position of at least a portion of the thermometer circuit without assistance from a user of the thermometer.

25. A thermometer, comprising:
   a plurality of sensors, at least one said sensor configured to generate range data;
   a thermometer circuit configured to generate at least a body temperature measurement for a target individual; and
   a processor configured to (i) analyze the range data to obtain a distance value representing a distance between the thermometer and a surface of a body of a target individual at which the thermometer is pointed, (ii) modify a sensitivity of the thermometer circuit by adjusting an overall size of an aperture of the thermometer circuit based on the distance value, and (iii) performing operations to cause alignment of the thermometer circuit with a target spot on the target individual by changing a position of at least a portion of the thermometer circuit without assistance from a user of the thermometer.

* * * * *